(12) United States Patent
Tucholski

(10) Patent No.: US 8,765,284 B2
(45) Date of Patent: Jul. 1, 2014

(54) MULTI-CELL BATTERY

(71) Applicant: Blue Spark Technologies, Inc., Westlake, OH (US)

(72) Inventor: Gary R. Tucholski, North Royalton, OH (US)

(73) Assignee: Blue Spark Technologies, Inc., Westlake, OH (US)

( * ) Notice: Subject to any disclaimer, the term of this patent is extended or adjusted under 35 U.S.C. 154(b) by 0 days.

(21) Appl. No.: 13/899,291

(22) Filed: May 21, 2013

(65) Prior Publication Data

US 2013/0323565 A1     Dec. 5, 2013

Related U.S. Application Data

(60) Provisional application No. 61/649,455, filed on May 21, 2012.

(51) Int. Cl.
    *H01M 2/24*           (2006.01)
    *H01M 6/40*           (2006.01)

(52) U.S. Cl.
    USPC ............ 429/127; 429/156; 429/158; 429/160

(58) Field of Classification Search
    None
    See application file for complete search history.

(56) References Cited

U.S. PATENT DOCUMENTS

| | | | |
|---|---|---|---|
| 629,325 A | 7/1899 | Ashley | |
| 629,372 A | 7/1899 | Kennedy | |
| 2,154,312 A | 4/1939 | Maccallum | |
| 2,480,531 A | 8/1949 | Wilke | |
| 2,637,757 A | 5/1953 | Wilke | |
| 2,688,649 A | 9/1954 | Bjorksten | |
| 2,903,498 A | 9/1959 | Sindel et al. | |
| 2,905,738 A | 9/1959 | Di Pasquale et al. | |
| 3,006,980 A | 10/1961 | Story | |

(Continued)

FOREIGN PATENT DOCUMENTS

| | | |
|---|---|---|
| DE | 19943961 A1 | 6/2000 |
| EP | 0678927 A1 | 10/1995 |

(Continued)

OTHER PUBLICATIONS

International Search Report and Written Opinion issued Aug. 27, 2013 in corresponding PCT Application Serial No. PCT/US2013/042079.

(Continued)

*Primary Examiner* — Ula C Ruddock
*Assistant Examiner* — Matthew Van Oudenaren
(74) *Attorney, Agent, or Firm* — Pearne & Gordon LLP

(57) ABSTRACT

A flexible battery includes a first substrate layer with a first cell portion, a second cell portion, and a bridge portion connecting the first and second cell portions. An electrical bridge electrically couples a first electrochemical cell to a second electrochemical cell in series or parallel, and an electrical bridge is flexible and extends across the bridge portion of the first substrate layer. A second substrate layer is connected to the first substrate layer such that both of the first and second electrochemical cells are separately sealed. The flexible battery is configured to be folded over itself along the bridge portion such that the first and second electrochemical cells are arranged in a covering relationship. Optionally, an open gap area is disposed over the bridge portion of the first substrate to facilitate folding the flexible battery over itself along a line extending through the bridge portion.

40 Claims, 8 Drawing Sheets

(56) References Cited

U.S. PATENT DOCUMENTS

| | | |
|---|---|---|
| 3,230,115 A | 1/1966 | Tamminen |
| 3,375,136 A | 3/1968 | Biggar |
| 3,655,449 A | 4/1972 | Yamamoto et al. |
| 3,705,047 A | 12/1972 | Marriott |
| 3,770,504 A | 11/1973 | Bergum |
| 3,799,808 A | 3/1974 | Hancock |
| 3,847,669 A | 11/1974 | Paterniti |
| 3,901,732 A | 8/1975 | Kalnoki Kis et al. |
| 3,928,077 A | 12/1975 | Sperandio et al. |
| 3,954,506 A | 5/1976 | Sullivan |
| 3,967,292 A | 6/1976 | Delahunt |
| 3,980,497 A | 9/1976 | Gillman et al. |
| 3,988,168 A | 10/1976 | Bruneau |
| 3,993,508 A | 11/1976 | Erlichman |
| 4,001,467 A | 1/1977 | Sullivan |
| 4,006,036 A | 2/1977 | Charkoudian |
| 4,007,472 A | 2/1977 | Land |
| 4,028,479 A | 6/1977 | Fanciullo et al. |
| 4,042,760 A | 8/1977 | Land |
| 4,047,289 A | 9/1977 | Wolff |
| 4,060,669 A | 11/1977 | Fanciullo |
| 4,070,528 A | 1/1978 | Bergum et al. |
| 4,080,728 A | 3/1978 | Buckler |
| 4,086,399 A | 4/1978 | Hyland et al. |
| 4,086,400 A | 4/1978 | Hyland et al. |
| 4,098,965 A | 7/1978 | Kinsman |
| 4,105,815 A | 8/1978 | Buckler |
| 4,105,831 A | 8/1978 | Plasse |
| 4,112,205 A | 9/1978 | Charkoudian et al. |
| 4,118,860 A | 10/1978 | Buckler et al. |
| 4,119,770 A | 10/1978 | Land |
| 4,124,742 A | 11/1978 | Land et al. |
| 4,125,684 A | 11/1978 | Land |
| 4,125,685 A | 11/1978 | Bloom et al. |
| 4,125,686 A | 11/1978 | Kinsman |
| 4,136,236 A | 1/1979 | Ruetschi |
| 4,137,627 A | 2/1979 | Kinsman |
| 4,145,485 A | 3/1979 | Kinsman |
| 4,150,200 A | 4/1979 | Sullivan |
| 4,152,825 A | 5/1979 | Bruneau |
| 4,172,184 A | 10/1979 | Bloom et al. |
| 4,172,319 A | 10/1979 | Bloom et al. |
| 4,175,052 A | 11/1979 | Norteman, Jr. |
| 4,177,330 A | 12/1979 | Gordon et al. |
| 4,177,552 A | 12/1979 | Gordon et al. |
| 4,181,778 A | 1/1980 | Land |
| 4,185,144 A | 1/1980 | Ames et al. |
| 4,194,061 A | 3/1980 | Land et al. |
| 4,195,121 A | 3/1980 | Peterson |
| 4,204,036 A | 5/1980 | Cohen et al. |
| 4,232,099 A | 11/1980 | Sullivan |
| 4,242,424 A | 12/1980 | Buckler et al. |
| 4,254,191 A | 3/1981 | Kniazzeh |
| 4,256,813 A | 3/1981 | Kniazzeh |
| 4,287,274 A | 9/1981 | Ibbotson et al. |
| 4,345,954 A | 8/1982 | Panchu |
| 4,361,633 A | 11/1982 | Nel et al. |
| 4,389,470 A | 6/1983 | Plasse |
| 4,400,452 A | 8/1983 | Bruder |
| 4,427,748 A | 1/1984 | Land |
| 4,429,026 A | 1/1984 | Bruder |
| 4,455,358 A | 6/1984 | Graham et al. |
| 4,466,470 A | 8/1984 | Bruder |
| 4,477,544 A | 10/1984 | Bruder |
| 4,502,903 A | 3/1985 | Bruder |
| 4,505,996 A | 3/1985 | Simonton |
| 4,525,439 A | 6/1985 | Simonton |
| 4,532,193 A | 7/1985 | Kniazzeh et al. |
| 4,539,275 A | 9/1985 | Plasse |
| 4,554,226 A | 11/1985 | Simonton |
| 4,604,334 A | 8/1986 | Tarascon |
| 4,608,279 A | 8/1986 | Schumm, Jr. |
| 4,609,597 A | 9/1986 | Plasse |
| 4,621,035 A | 11/1986 | Bruder |
| 4,623,598 A | 11/1986 | Waki et al. |
| 4,664,993 A | 5/1987 | Sturgis et al. |
| 4,756,717 A | 7/1988 | Sturgis et al. |
| 4,889,777 A | 12/1989 | Akuto |
| 4,916,035 A | 4/1990 | Yamashita et al. |
| 4,977,046 A | 12/1990 | Bleszinski, Jr. et al. |
| 4,997,732 A | 3/1991 | Austin et al. |
| 5,035,965 A | 7/1991 | Sangyoji et al. |
| 5,055,968 A | 10/1991 | Nishi et al. |
| 5,110,696 A | 5/1992 | Shokoohi et al. |
| 5,116,701 A | 5/1992 | Kalisz |
| 5,120,785 A | 6/1992 | Walker et al. |
| 5,217,828 A | 6/1993 | Sangyoji et al. |
| 5,259,891 A | 11/1993 | Matsuyama et al. |
| 5,326,652 A | 7/1994 | Lake |
| 5,330,860 A | 7/1994 | Grot et al. |
| 5,338,625 A | 8/1994 | Bates et al. |
| 5,350,645 A | 9/1994 | Lake et al. |
| 5,401,590 A | 3/1995 | Chalilpoyil et al. |
| 5,415,888 A | 5/1995 | Banerjee et al. |
| 5,424,151 A | 6/1995 | Koksbang et al. |
| 5,445,856 A | 8/1995 | Chaloner-Gill |
| 5,455,127 A | 10/1995 | Olsen et al. |
| 5,470,357 A | 11/1995 | Schmutz et al. |
| 5,514,492 A | 5/1996 | Marincic et al. |
| 5,547,911 A | 8/1996 | Grot |
| 5,565,143 A | 10/1996 | Chan |
| 5,578,390 A | 11/1996 | Hughen |
| 5,587,254 A | 12/1996 | Kojima et al. |
| 5,620,580 A | 4/1997 | Okabe et al. |
| 5,622,652 A | 4/1997 | Kucherovsky et al. |
| 5,624,468 A | 4/1997 | Lake |
| 5,637,418 A | 6/1997 | Brown et al. |
| 5,652,043 A | 7/1997 | Nitzan |
| 5,658,684 A | 8/1997 | Lake |
| 5,728,181 A | 3/1998 | Jung et al. |
| 5,735,912 A | 4/1998 | Lake |
| 5,735,914 A | 4/1998 | Lake |
| 5,747,190 A | 5/1998 | Lake |
| 5,747,191 A | 5/1998 | Lake |
| 5,759,215 A | 6/1998 | Masuda |
| 5,779,839 A | 7/1998 | Tuttle et al. |
| 5,811,204 A | 9/1998 | Nitzan |
| 5,865,859 A | 2/1999 | Lake |
| 5,897,522 A | 4/1999 | Nitzan |
| 5,906,661 A | 5/1999 | Lake |
| 5,930,023 A | 7/1999 | Mitchell, Jr. et al. |
| 5,941,844 A | 8/1999 | Eckenhoff |
| 6,015,520 A | 1/2000 | Appelt et al. |
| 6,025,089 A | 2/2000 | Lake |
| 6,030,423 A | 2/2000 | Lake |
| 6,030,721 A | 2/2000 | Lake |
| 6,045,942 A | 4/2000 | Miekka et al. |
| 6,078,842 A | 6/2000 | Gross et al. |
| 6,084,380 A | 7/2000 | Burton |
| RE36,843 E | 8/2000 | Lake et al. |
| 6,136,468 A | 10/2000 | Mitchell, Jr. et al. |
| 6,157,858 A | 12/2000 | Gross et al. |
| 6,186,982 B1 | 2/2001 | Gross et al. |
| 6,187,475 B1 | 2/2001 | Oh et al. |
| 6,200,704 B1 | 3/2001 | Katz et al. |
| 6,208,524 B1 | 3/2001 | Tuttle |
| 6,235,422 B1 | 5/2001 | Kaplan et al. |
| 6,243,192 B1 | 6/2001 | Mitchell, Jr. et al. |
| 6,273,904 B1 | 8/2001 | Chen et al. |
| 6,277,520 B1 | 8/2001 | Moutsios et al. |
| 6,287,721 B1 | 9/2001 | Xie et al. |
| 6,317,630 B1 | 11/2001 | Gross et al. |
| 6,369,793 B1 | 4/2002 | Parker |
| 6,379,835 B1 | 4/2002 | Kucherovsky et al. |
| 6,395,043 B1 | 5/2002 | Shadle et al. |
| 6,421,561 B1 | 7/2002 | Morris |
| 6,458,234 B1 | 10/2002 | Lake et al. |
| 6,503,658 B1 | 1/2003 | Klein et al. |
| 6,541,712 B1 | 4/2003 | Gately et al. |
| 6,569,572 B1 | 5/2003 | Ochiai et al. |
| 6,576,364 B1 | 6/2003 | Mitchell, Jr. et al. |
| 6,643,532 B2 | 11/2003 | Axelgaard |
| 6,653,014 B2 | 11/2003 | Anderson et al. |
| 6,664,006 B1 | 12/2003 | Munshi |

(56) References Cited

U.S. PATENT DOCUMENTS

| | | | |
|---|---|---|---|
| 6,676,021 B1 | 1/2004 | Luski et al. |
| 6,676,714 B2 | 1/2004 | Langan |
| 6,697,694 B2 | 2/2004 | Mogensen |
| 6,708,050 B2 | 3/2004 | Carim |
| 6,709,778 B2 | 3/2004 | Johnson |
| 6,729,025 B2 | 5/2004 | Farrell et al. |
| 6,740,451 B2 | 5/2004 | Christian et al. |
| 6,743,546 B1 | 6/2004 | Kaneda et al. |
| 6,752,842 B2 | 6/2004 | Luski et al. |
| 6,757,560 B1 | 6/2004 | Fischer et al. |
| 6,816,125 B2 | 11/2004 | Kuhns et al. |
| 6,836,215 B1 | 12/2004 | Laurash et al. |
| 6,855,441 B1 | 2/2005 | Levanon |
| 6,884,546 B1 | 4/2005 | Fujita et al. |
| 6,888,502 B2 | 5/2005 | Beigel et al. |
| 6,899,976 B2 | 5/2005 | Larson et al. |
| 6,915,159 B1 | 7/2005 | Kuribayashi et al. |
| 7,017,822 B2 | 3/2006 | Aisenbrey |
| 7,022,431 B2 | 4/2006 | Shchori et al. |
| 7,031,768 B2 | 4/2006 | Anderson et al. |
| 7,043,297 B2 | 5/2006 | Keusch et al. |
| 7,049,962 B2 | 5/2006 | Atherton et al. |
| 7,224,280 B2 | 5/2007 | Ferguson et al. |
| RE39,676 E | 6/2007 | Nitzan |
| 7,238,196 B2 | 7/2007 | Wibaux |
| 7,244,326 B2 | 7/2007 | Craig et al. |
| 7,294,209 B2 | 11/2007 | Shakespeare |
| 7,320,845 B2 | 1/2008 | Zucker |
| 7,335,441 B2 | 2/2008 | Luski et al. |
| 7,340,297 B2 | 3/2008 | Tamarkin et al. |
| 7,340,310 B2 | 3/2008 | Nitzan et al. |
| 7,348,096 B2 | 3/2008 | Schubert et al. |
| 7,364,896 B2 | 4/2008 | Schembri |
| 7,368,191 B2 | 5/2008 | Andelman et al. |
| 7,383,083 B2 | 6/2008 | Fischer et al. |
| 7,394,382 B2 | 7/2008 | Nitzan et al. |
| 7,483,738 B2 | 1/2009 | Tamarkin et al. |
| 7,491,465 B2 | 2/2009 | Nitzan et al. |
| 7,501,208 B2 | 3/2009 | Feddrix et al. |
| 7,599,192 B2 | 10/2009 | Pennaz et al. |
| 7,603,144 B2 | 10/2009 | Jenson et al. |
| 7,625,664 B2 | 12/2009 | Schubert et al. |
| 7,643,874 B2 | 1/2010 | Nitzan et al. |
| 7,652,188 B2 | 1/2010 | Levanon et al. |
| 7,727,290 B2 | 6/2010 | Zhang et al. |
| 8,029,927 B2 | 10/2011 | Tucholski |
| 8,268,475 B2 | 9/2012 | Tucholski |
| 8,441,411 B2 | 5/2013 | Tucholski et al. |
| 2002/0086215 A1 | 7/2002 | Tamura et al. |
| 2002/0095780 A1 | 7/2002 | Shadle et al. |
| 2002/0110733 A1 | 8/2002 | Johnson |
| 2002/0182485 A1 | 12/2002 | Anderson et al. |
| 2002/0192542 A1 | 12/2002 | Luski et al. |
| 2003/0014014 A1 | 1/2003 | Nitzan |
| 2003/0059673 A1 | 3/2003 | Langan et al. |
| 2003/0082437 A1 | 5/2003 | Sotomura |
| 2003/0165744 A1 | 9/2003 | Schubert et al. |
| 2003/0187338 A1 | 10/2003 | Say et al. |
| 2003/0219648 A1 | 11/2003 | Zucker |
| 2003/0232248 A1 | 12/2003 | Iwamoto et al. |
| 2004/0001998 A1 | 1/2004 | Hopkins et al. |
| 2004/0009398 A1 | 1/2004 | Dorfman |
| 2004/0018422 A1 | 1/2004 | Islam et al. |
| 2004/0170893 A1 | 9/2004 | Nakaishi et al. |
| 2004/0209160 A1 | 10/2004 | Luski et al. |
| 2004/0217865 A1 | 11/2004 | Turner |
| 2004/0267189 A1 | 12/2004 | Mavor et al. |
| 2004/0267190 A1 | 12/2004 | Tamarkin et al. |
| 2004/0267283 A1 | 12/2004 | Mavor et al. |
| 2005/0013783 A1 | 1/2005 | Perricone |
| 2005/0038473 A1 | 2/2005 | Tamarkin et al. |
| 2005/0085751 A1 | 4/2005 | Daskal et al. |
| 2005/0147880 A1 | 7/2005 | Takahashi et al. |
| 2005/0194454 A1 | 9/2005 | Ferber et al. |
| 2005/0260492 A1 | 11/2005 | Tucholski et al. |
| 2006/0001528 A1 | 1/2006 | Nitzan et al. |
| 2006/0007049 A1 | 1/2006 | Nitzan et al. |
| 2006/0012464 A1 | 1/2006 | Nitzan et al. |
| 2006/0131616 A1 | 6/2006 | Devaney et al. |
| 2006/0159899 A1 | 7/2006 | Edwards et al. |
| 2006/0211936 A1 | 9/2006 | Hu et al. |
| 2006/0216586 A1* | 9/2006 | Tucholski ..................... 429/162 |
| 2006/0227669 A1 | 10/2006 | Pennaz et al. |
| 2006/0253061 A1 | 11/2006 | Anderson et al. |
| 2006/0264804 A1 | 11/2006 | Karmon et al. |
| 2007/0007661 A1 | 1/2007 | Burgess et al. |
| 2007/0011870 A1 | 1/2007 | Lerch et al. |
| 2007/0016277 A1 | 1/2007 | Karat et al. |
| 2007/0020516 A1 | 1/2007 | Yoon |
| 2007/0024425 A1 | 2/2007 | Nitzan et al. |
| 2007/0060862 A1 | 3/2007 | Sun et al. |
| 2007/0066930 A1 | 3/2007 | Tanioka et al. |
| 2007/0243459 A1 | 10/2007 | Jenson et al. |
| 2008/0007409 A1 | 1/2008 | Ferry et al. |
| 2008/0021436 A1 | 1/2008 | Wolpert et al. |
| 2008/0041822 A1 | 2/2008 | Wang |
| 2008/0091095 A1 | 4/2008 | Heller et al. |
| 2008/0174380 A1 | 7/2008 | Nitzan et al. |
| 2008/0218345 A1 | 9/2008 | Nitzan et al. |
| 2008/0272890 A1 | 11/2008 | Nitzan et al. |
| 2009/0038746 A1 | 2/2009 | Tucholski |
| 2009/0136832 A1 | 5/2009 | Mitsuda et al. |
| 2010/0209756 A1 | 8/2010 | Bailey et al. |
| 2010/0266895 A1 | 10/2010 | Tucholski |
| 2011/0241446 A1 | 10/2011 | Tucholski |
| 2011/0262779 A1 | 10/2011 | Maleki et al. |
| 2011/0274960 A1 | 11/2011 | Ahn |
| 2013/0074330 A1 | 3/2013 | Tucholski |
| 2013/0171490 A1* | 7/2013 | Rothkopf et al. ............. 429/120 |
| 2013/0273413 A1* | 10/2013 | Fahlgren et al. ............. 429/159 |

FOREIGN PATENT DOCUMENTS

| | | | |
|---|---|---|---|
| EP | 0862227 A1 | 9/1998 |
| EP | 1026767 A1 | 8/2000 |
| EP | 1096589 A1 | 5/2001 |
| EP | 1107336 A2 | 6/2001 |
| EP | 2003940 A2 | 12/2008 |
| JP | 55-133770 A | 10/1980 |
| JP | 58-206048 A | 12/1983 |
| JP | 59-228353 A | 12/1984 |
| JP | 61-55866 A | 3/1986 |
| JP | 61-64077 A | 4/1986 |
| JP | 62-126557 A | 6/1987 |
| JP | 62-165875 A | 7/1987 |
| JP | 62-165876 A | 7/1987 |
| JP | 62-285954 A | 12/1987 |
| JP | 63-81762 A | 4/1988 |
| JP | 63-119155 A | 5/1988 |
| JP | 64-24364 A | 1/1989 |
| JP | 2-273464 A | 11/1990 |
| JP | 4-276665 A | 10/1992 |
| JP | 5-217587 A | 8/1993 |
| JP | 5-225989 A | 9/1993 |
| JP | 5-275087 A | 10/1993 |
| JP | 2000-164033 A | 6/2000 |
| JP | 2000-229128 A | 8/2000 |
| JP | 2000-319381 A | 11/2000 |
| JP | 2001-23695 A | 1/2001 |
| JP | 2001-521676 A | 11/2001 |
| JP | 2003-151634 A | 5/2003 |
| JP | 2003-282148 A | 10/2003 |
| JP | 2004-336240 A | 11/2004 |
| JP | 2005-39256 A | 2/2005 |
| TW | 540185 B | 7/2003 |
| WO | 96/38867 A1 | 12/1996 |
| WO | 97/17735 A1 | 5/1997 |
| WO | 98/22987 A2 | 5/1998 |
| WO | 98/48469 A1 | 10/1998 |
| WO | 00/17950 A1 | 3/2000 |
| WO | 00/36672 A1 | 6/2000 |

(56) References Cited

FOREIGN PATENT DOCUMENTS

| WO | 03/069700 A2 | 8/2003 |
|---|---|---|
| WO | 2006/003648 A2 | 1/2006 |
| WO | 2012/057931 A1 | 5/2012 |

OTHER PUBLICATIONS

Acheson Colloids Company, "Sales Information Bulletin," Port Huron, MI, Date of reference: 2013.
Acheson Industries, "Acheson Electrical Materials," from www.achesonindustries.com, dated Nov. 24, 2009.
Advanced Coatings and Chemicals, "Technical Data Sheet," Temple City, CA, Date of reference: 2013.
Hartman, Lauren R., "Flexibles stay resilient," Packaging Digest, Mar. 1, 2005.
Linden, D., Handbook of Batteries and Fuel Cells, pp. 5.5-5.7, McGraw-Hill, Inc., 1984.
Linden, D., Handbook of Batteries, Second Edition, pp. 8.8-8.9, McGraw-Hill, Inc., 1995.
Omnexus Adhesives & Sealant Solutions, "Ethylene Vinyl Acetate (EVA) and Other Hot Melts," from http://www.omnexus4adhesives.com/bc/construction-channel/index.aspx?id=ethylene, Date of reference: 2013.

\* cited by examiner

MULTI-CELL BATTERY

CROSS-REFERENCE TO RELATED APPLICATIONS

This application claims the benefit of U.S. provisional application Ser. No. 61/649,455, filed on May 21, 2012, which is incorporated herein in its entirety by reference thereto.

BACKGROUND OF THE INVENTION

For the past one hundred years or so, scientists have been making Carbon/Zinc portable power sources for various applications. In the early days of portable power, these power sources were very large compared to today's standards. For example, the very popular "Igniter Cell" made by Eveready was about 3" diameter and about 9" tall and was used in many applications such as radios, buzzers, Xmas lighting, etc. These large cells, as well as some smaller versions, such as the famous Eveready #6 (about 2" dia.×6" tall) and the smallest unit cell of the day, the #950 (D size), were commonly made into battery packs with voltages exceeding 40 volts in some applications. These were similar in size, and even larger, than today's car batteries, for uses in lighting devices, radios and car ignition systems. In the mid 1900's, with the advent of advanced electronics such as the transistor, the electrical requirements for portable power sources were drastically reduced. Consequently, cell sizes could also be reduced to include C's, AA's, and AAA's, and even small button cells. This power reduction has continued into the twenty-first century, where applications such as smart labels, smart credit cards, sensors, data loggers, novelty devices such as greeting cards and badges, etc., now require a maximum current of milliamperes, with many applications requiring as little as a few microamperes at about 1.5-3.0 volts. These applications also have the requirement that the power sources be flat and very thin to maintain their low profiles and portability.

In the past twenty-five years, various approaches for making thin, flat cells and batteries were attempted by numerous scientists and corporations. These include the widely known instant film battery pack developed by Polaroid. This battery pack was used in each package of Polaroid instant film. This allowed Polaroid to have a fresh battery in the camera each time the user placed a new pack of film in the camera. This high cost battery with multiple layers and a metal foil laminate package is a high voltage, high current battery, capable of igniting flash bulbs and powering motors, for example, and is not a realistic competitor of the new thin low cost batteries that are needed. In addition to Polaroid, others have tried to develop thin batteries in various electrochemical systems.

In recent years, printed electronics on flexible substrates has become a new process and growing in popularity. In this process, the circuit is printed as well as some of the electronic components. Typically this type of circuit could include a display, IC chip, sensor, antennae, lights and a low capacity power source such as a flat printed battery. In some applications, the power source could also be printed in a totally integrated manner. However, there remain some other applications where economic considerations and/or technical or compatibility considerations make it difficult or non-feasible to print the power source on the circuit. Thus, the power source can be integrated in a different manner. In order to reduce costs, the power source can be a printed as a flat battery that is provided as a complete cell/battery for later integration into the desired circuit. A typical cell can provide about 1.5 volts DC. Where greater voltages are required, it is conventionally known to connect two or more cells in series to increase the voltage. Similarly, multiple cells can be connected together in parallel to increase the effective capacity, as well as increase the current capability. For example, a battery can include two cells electrically connected in series to provide 3 volts DC. Still, it is desirable to reduce the overall size of the battery, even with multiple cells, for use in small circuits.

Co-pending U.S. application Ser. No. 11/110,202 filed on Apr. 20, 2005, Ser. No. 11/379,816 filed on Apr. 24, 2006, Ser. No. 12/809,844 filed on Jun. 21, 2010, Ser. No. 13/075,620 filed on Mar. 30, 2011, and Ser. No. 13/625,366 filed on Sep. 24, 2012, as well as issued U.S. Pat. Nos. 8,029,927, 8,268,475, 8,441,411 are incorporated herein by reference, discuss new designs and methods of manufacture of a flat cell and battery.

With the growing market needs for low cost, low capacity thin flat cells, it would be beneficial to produce a thin, flat, printable flexible cell that is versatile and inexpensive to mass-produce. Printable, disposable thin cells that are well suited for low-power and high-production volume applications would be useful, especially if they offer adequate voltage, sufficient capacity, and low-cost solutions. Conventional low-profile batteries typically have few of these attributes, if any. Still, it is possible to utilize a low-profile battery (i.e., a coin cell or button cell), or any other type of battery, in the instant electrical device.

SUMMARY OF THE INVENTION

The following presents a simplified summary of the invention in order to provide a basic understanding of some aspects of the invention. This summary is not an extensive overview of the invention. It is intended to identify neither key nor critical elements of the invention nor delineate the scope of the invention. Its sole purpose is to present some concepts of the invention in a simplified form as a prelude to the more detailed description that is presented later.

In accordance with one aspect of the present application, a flexible battery is provided for generating an electrical current. A first substrate layer comprises a first cell portion, a second cell portion, and a bridge portion connecting the first and second cell portions. A first electrochemical cell is provided on the first cell portion, comprising a first anode and a first cathode, and a second electrochemical cell is provided on the second cell portion, comprising a second anode and a second cathode. An electrical bridge electrically couples the first electrochemical cell to the second electrochemical cell in series or parallel, wherein the electrical bridge is flexible and extends across the bridge portion of the first substrate layer. First and second liquid electrolytes are provided, respectively, in contact with the first and second electrochemical cells. A second substrate layer is connected to said first substrate layer to contain each of said first and second liquid electrolytes such that both of the first and second electrochemical cells are separately sealed. The flexible battery is configured to be folded over itself along the bridge portion such that the first and second electrochemical cells are arranged in a covering relationship.

In accordance with another aspect of the present application, a flexible battery is provided for generating an electrical current. A first substrate layer comprises a first cell portion, a second cell portion, and a bridge portion connecting the first and second cell portions. A current collector layer is provided at least partially on both of the first and second cell portions of first substrate layer, and extending across the bridge portion. A first cathode layer and a first anode layer are provided on the first cell portion of the first substrate to form a first electrochemical cell. A second cathode layer and a second anode layer are provided on the second cell portion of the first substrate to form a second electrochemical cell. One of the cathode layer and anode layer of the first electrochemical cell, and one of the cathode layer and anode layer of the second electrochemical cell, are both provided on the current collector layer. A first electrode contact is coupled to one of the cathode layer and anode layer of the first electrochemical cell, and a second electrode contact is coupled to one of the cathode layer and anode layer of the second electrochemical cell. First and second liquid electrolytes provided, respectively, in contact with the first and second electrochemical cells. A second substrate layer is connected to said first substrate layer to form first and second inner spaces, respectively, containing each of said first and second liquid electrolytes. The flexible battery is configured to be folded over itself along the bridge portion such that the first and second electrochemical cells are arranged in a covering relationship over each other.

In accordance with yet another aspect of the present application, a flexible battery is provided for generating an electrical current. A first substrate layer comprises a first cell portion, a second cell portion, and a bridge portion connecting the first and second cell portions. A first electrochemical cell is provided on the first cell portion, and a second electrochemical cell is provided on the second cell portion. An electrical bridge electrically couples the first electrochemical cell to the second electrochemical cell in series or parallel, wherein the electrical bridge is flexible and extends across the bridge portion of the first substrate layer. First and second liquid electrolytes are provided, respectively, in contact with the first and second electrochemical cells. A second substrate layer is connected to said first substrate layer to contain each of said first and second liquid electrolytes such that both of the first and second electrochemical cells are separately sealed. The flexible battery is configured to be folded over itself along the bridge portion such that the first and second electrochemical cells are arranged in a covering relationship. An open gap area is disposed between the first substrate layer and second substrate layer, and over the bridge portion of the first substrate, to thereby facilitate folding the flexible battery over itself along a line extending through the bridge portion.

BRIEF DESCRIPTION OF THE DRAWINGS

The foregoing and other features and advantages of the present invention will become apparent to those skilled in the art to which the present invention relates upon reading the following description with reference to the accompanying drawings, in which.

DETAILED DESCRIPTION OF EXAMPLE EMBODIMENTS

Figure 1:
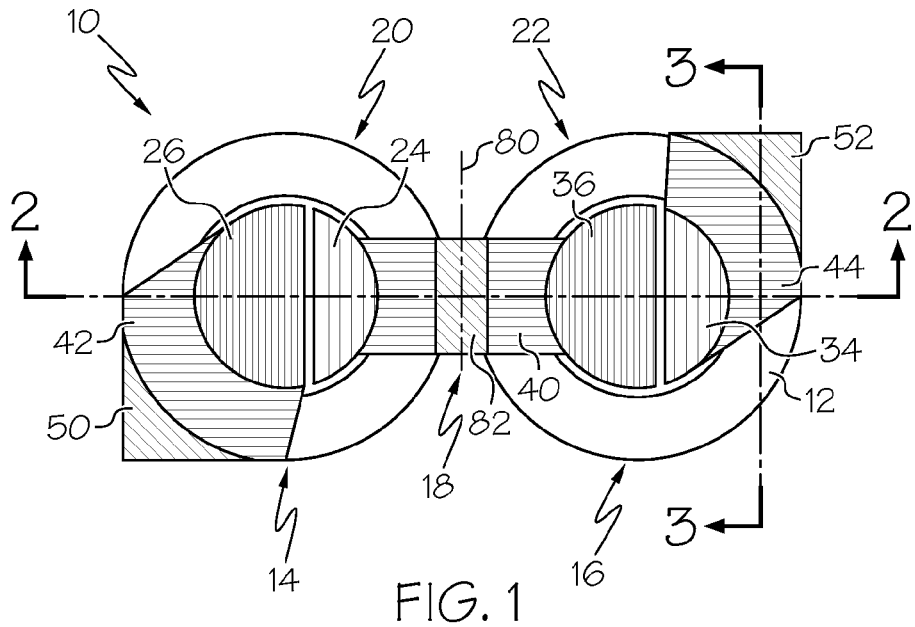
FIG. 1 illustrates a top, partial detail view of an example flexible multi-cell battery according to one embodiment of the instant application.

In the instant application, a flexible battery is provided for generating electrical current that comprises a plurality of electrochemical cells. Generally, some or all of the electrochemical cells are manufactured in the same overall operation. The flexible battery is folded over itself to provide a finished battery with multiple cells having a reduced surface area, such as substantially similar to that of battery with a single cell. For example, once the battery is completed, it is folded over itself about a fold-over line that can be located variously, such as about half-way along the length of the battery or at other locations. The top or bottom substrate, depending on which way the battery is folded, can include an exterior adhesive (e.g., PSA) such that when the battery is folded over itself it remains in a folded condition. Still, it is contemplated that the two (or more) cells could be used without folding, if desired.

Various methods can be used to manufacture flat batteries. In one example, the electrochemical cells (i.e., batteries) are typically printed and/or laminated on a continuous, flexible substrate web, and may be formed into a roll or the like. The individual batteries can be removed from the roll, such as one at a time. For example, the batteries can be cut from the roll, and/or perforations of the flexible substrate roll can be provided for easy tear off. In addition, the batteries can further be manufactured in an integrated process with one or more electrical components, such as an antenna, display, and/or a processor, for example. The multiple facets of this application could be used in the total package described and/or they could be used individually or in any combination.

As used herein, unless otherwise explicitly indicated, all percentages are percentages by weight. Also, as used herein, when a range such as "5-25" (or "about 5-25") is given, this means, for at least one embodiment, at least about 5 and, separately and independently, not more than about 25, and unless otherwise indicated, ranges are not to be strictly construed, but are given as acceptable examples. Also herein, a parenthetical range following a listed or preferred value indicates a broader range for that value according to additional embodiments of the application.

The present application relates to thin, printed electrochemical cells and/or batteries comprising a plurality of such cells. Such cells each typically include at least a first electrode including a first electrochemical layer (e.g., a cathode), a second electrode including a second electrochemical layer (e.g., an anode), and an electrolyte that interacts with the electrodes to create an electrical current. All of the first and second electrodes and the electrolyte are typically contained within some structure which provides an external electrical access to the electrodes for providing an electrical current supply to some device. Herein, the flexible battery comprises at least two electrochemical cells that are electrically connected in series or parallel. It is understood that while the described examples illustrate a 3 volt DC battery with two cells, batteries of various sizes and capacities can be formed using similar structure and/or methodology described herein.

One method of mass-producing such cells includes depositing aqueous and/or non-aqueous solvent inks and/or other coatings in a pattern on a special substrate, such as a laminated polymeric film layer, for example. The depositing can be by means of, for example, printing electrochemical inks and/or laminating a metallic foil, such as zinc foil, for example, on one or more high-speed web rotary screen printing presses, especially if the desired volumes are very high. If volumes are relatively lower, say in the quantities of only about several million or less, then relatively slower methods such as web printing with flat bed screens could be appropriate. If the volumes are even lower, such as hundreds or thousands, then a sheet-fed flat bed printing press may be utilized, for example. Still, various printing methods can be used for various desired quantities.

After the inks are printed and/or the solids have been properly placed, the cells can be completed (e.g., sealed, die cut, stacked and/or perforated and wound into a roll, or stacked if sheets are used on a printing press). This cell manufacturing process can also be utilized for integrating one or more individual cells with an actual electronic application, or into batteries comprising multiple cells connected in series or parallel, or some combination of the two. Examples of such devices and corresponding processes will be described later, but many additional embodiments are also contemplated.

As discussed above, the battery may be described as a printed, flexible, and thin. Such a cell/battery can include, for example, a lower film substrate that can utilize a special polymer laminate that has special features, possibly including, for example, a high moisture barrier layer in the center that is surrounded by polymer films on both sides. Furthermore, one or both outside surfaces can be made to be print receptive for printing information, logos, instructions, identifications, serial numbers, graphics, or other information or images, as desired.

Depending on which construction of this battery is used, one ply of a multi-ply substrate could also feature a heat-sealing layer that might be co-extruded adjacent the barrier coating. In addition, a portion one substrate layer of a cell of at least some embodiments could utilize a cathode current collector and/or an anode current collector, such as carbon, for example, printed or coated or otherwise applied on a portion of the film substrate. At an outside contact area of this collector can also be printed a layer of a relatively highly conductive ink, such as carbon, gold, silver, nickel, zinc, or tin, for example, to improve the conductivity to the application connection, if desired. However, if the battery application is used for relatively low current requirements, then the higher conductive layer contact material, or even the current collector, may not be utilized for one or both electrodes.

For at least some embodiments, a water-based ink electrochemical layer is printed as the cathode. Such a cathode layer can include, for example, manganese dioxide ($MnO_2$), carbon (e.g., graphite), a polymer binder, and water. Other formulations for the cathode layer can also be utilized with or without any of these materials. If a cathode collector layer is used, the cathode electrochemical layer will be printed on at least a portion of the cathode current collector, which is printed or otherwise applied first to the substrate. Still, the cathode current collector may or may not form a portion of the cathode layer.

Regarding the anode, in an off-line operation, a dry-film adhesive layer, possibly using a release liner, can be applied to the zinc foil. The zinc foil can then be laminated to the base substrate. Additionally, the anode layer could be applied by printing a zinc ink onto the substrate or on top of a collector, such as carbon. Where carbon is used, it could be printed in the same station as the carbon collector used for the cathode and electrical bridge.

Optionally, printed over one or both the anode and cathode, is a starch ink or similar material. The starch ink can act as an electrolyte absorber to keep the electrodes "wet" after an aqueous electrolyte solution is added to the cell. This starch ink could also include the electrolyte salts and the water used for the cell reaction. A paper layer over the anode and cathode could be used in place of the printed starch. In at least one embodiment, the construction of the printed starch layer with the addition of the aqueous electrolyte could be replaced, for example, by a printable viscous liquid (which could include a gel, or some other viscous material) that effectively covers at least a portion, such as substantially all, of each electrode. One such printable gel is described in United States Patent Publication 200310165744A1, published on Sep. 4, 2003, and incorporated herein by reference. These viscous formulations could, for example, utilize the electrolyte formulas and concentrations as discussed herein.

Optionally, for some embodiments, after the two electrodes are in place, with or without the starch layer(s), an optional cell "picture frame" can be added. This could be done using a number of different methods. One method is to print this optional cell picture frame with a dielectric ink and/or adhesive, for example. Another method is to utilize an optional polymer sheet or a laminated polymer sheet that includes adhesive layers, that is stamped, die cut, laser cut or similar methods to form the appropriate "pockets" (inner space or spaces) to house materials of each unit cell as well as to expose the electrical contacts to connect the device. It is contemplated that the flexible battery can be formed with or without the frame. For example, while the frame can offer one method for providing inner space for the electrochemical cells, it is also contemplated that the first and second substrates could be secured together to provide the inner space for the electrochemical cells without the use of a frame.

To ensure good sealing of the picture frame to the substrates, and to provide good sealing of the contact feed-through (providing an electrical pathway from the cell inside to the cell exterior), a sealing or caulking adhesive could be printed over the contact feed-through and the substrate, such as in the same pattern as the cell frame, for example, prior to the frame being printed or prior to the polymer sheets being inserted, for example.

This sealing or caulking material could be pressure sensitive, and/or heat sensitive, for example, such as Acheson Colloids' PM040, for example, or any other type of material that would facilitate sealing to both surfaces.

After the dielectric picture frame is printed and dried and/or cured, a heat sensitive sealing adhesive can be printed on top of the frame to allow good sealing of the top substrate to the cell frame. This cell picture frame could also comprise a polymer film or a laminated film of about 0.015" thick (range of about 0.003"-0.050") that is pre-punched and then laminated in registration to match the preprinted caulking adhesive layer described above.

Zinc chloride ($ZnCl_2$) can be chosen as the electrolyte, for at least some embodiments, in the concentration range of about 18%-45% by weight, for example. In one example, about 27% may be preferred. The electrolyte can be added, for example, to the open cell. To facilitate processing on the line, this electrolyte, or a different electrolyte, could be thickened with, for example, CMC at about a level of about 0.6 wgt % (range of about 0.05%-1.0%).

Other useful electrolyte formulations, such as ammonium chloride ($NH_4Cl$), mixtures of zinc chloride ($ZnCl_2$) and ammonium chloride ($NH_4Cl$), zinc acetate ($Zn(C_2H_2O_2)$), zinc bromide ($ZnBr_2$), zinc fluoride ($ZnF_2$), zinc tartrate ($ZnC_4H_4O_6 \cdot H_2O$), zinc per-chlorate $Zn(ClO_4)_2 \cdot 6H_2O$), potassium hydroxide, sodium hydroxide, or organics, for example, could also be used.

Zinc chloride may be the electrolyte of choice, providing excellent electrical performance for ordinary environmental conditions normally encountered. Likewise, any of the above mentioned alternative electrolytes, among others, could be used in concentrations (by weight), for example, within the range of about 18%-50%, with the range of about 25%-45% used for at least some other embodiments. Such compositions could also provide acceptable performance under ordinary environmental conditions. When zinc acetate is used to achieve improved low temperature performance for low temperature applications, the zinc acetate concentration in the range of about 31-33, is often acceptable, although ranges of about 30-34, about 28-36, about 26-38, and even about 25-40, weight percent, could also be utilized.

The use of electrolytes other than of zinc chloride can provide improved cell/battery electrical performance under some differing environmental conditions. For example, about 32% by weight zinc acetate (F.P.—freezing point—about 28° C.) exhibits a lower freezing point than about 32% by weight zinc chloride (F.P. about −23° C.). Both of these solutions exhibit a lower freezing point than of about 27% zinc chloride (F.P. about −18° C.). Other zinc acetate concentrations, e.g. about 18-45 or about 25-35 weight percent, also exhibit reduced freezing points. Alternatively, an alkaline electrolyte such as Sodium hydroxide (NaOH) or potassium hydroxide (KOH) could be used as an electrolyte to provide improved cell/battery electrical performance under some differing environmental conditions. The cell performance could be greatly enhanced due to the much higher conductivity of the KOH electrolyte. For example, a good working range of KOH would be concentrations (by weight) within the range of about 23%-45%.

Use of such electrolyte formulations as substitutes for zinc chloride, or in various mixtures used in cells, can allow for improved performance at low temperatures. For example, it has been found that the use of an about 32% zinc acetate electrolyte substantially improves low temperature (i.e. below about −20° C.) performance of a voltaic cell. This type of electrochemical cell performance improvement at low temperature can be utilized in the growing business of battery assisted RFID tags, for example, and/or other transient (transportable) electrically operated devices, such as smart active labels and temperature tags, for example, which may be used in cold environments.

For example, many products that are shipped today, such as food products pharmaceuticals, blood, etc, may require low temperature storage and shipping conditions, or even low temperature operation. To ensure safe shipment of such goods, these items can be tracked with RFID tags, sensors, and/or displays. These tags and/or labels might require electrochemical cells and/or batteries to operate effectively at temperatures at, or even below, −20° C., such as at about −23° C., about −27° C., or even at about −30° C. or less.

The upper substrate of a cell package could utilize a special laminated polymeric film. The upper layer is sealed around the edges of the cell frame by means of a pressure sensitive adhesive (PSA), and/or with the heat sensitive sealing adhesive that was previously printed or just with the heat sealing layer of both the upper and lower substrates, thus confining the internal components within the cell frame.

The above-described constructions can be wet cell constructions; however, using a similar cell construction, the battery could be also be made into a reserve cell construction, which has the benefit of providing extended shelf life prior to the application of a liquid. The printable, flexible, zinc chloride thin cell is made environmentally friendly.

The devices for which this technology can be used are extensive. Devices that utilize relatively low power or a limited life of one to three years, and possibly longer, could function utilizing a thin cell/battery of the type described herein. The cell, as explained in the above paragraphs and below, can often be inexpensively mass-produced so that it can be used in a disposable product, for example. The low cost allows for applications that previously were not cost effective, and could now be commercially feasible.

The electrochemical cell/battery according to the application might have one or more of the following advantages:

Flat, and of relatively uniform thickness, where the edges are thinner than the thickness at the center;

Relatively thin;

Flat, and of relatively uniform thickness, where the edges are of about the same thickness as the center;

Flexible;

Many geometric shapes are possible;

Sealed container;

Simple construction;

Designed for high speed and high volume production;

Low cost;

Reliable performance at many temperatures;

Good low temperature performance;

Disposable and environmentally friendly;

Both cell/battery contacts provided on opposite surfaces, or even the same surface;

Both Cell/battery contacts can be provided at many locations on the battery exterior;

Ease of assembly into an application; and

Capable of being easily integrated in a continuous process at the same time that the electronic application is being made.

The above provides a general description of various cell constructions according to some embodiments of this application, and further details utilizing drawings follow below. Cell and battery production processes for cell manufacturing, printing and/or assembly also will be described as well.

In one example, such as where relatively high speed, high output manufacturing is contemplated, such as 50 linear feet per minute or another relatively high speed, multiple webs can be used. It is to be understood that the multiple webs can be generally continuous, and can be utilized with known web manufacturing equipment. A first web can be relatively thin, such as ~0.001"-0.010" and preferably about 0.002-0.006", flexible base substrate including a multi-ply laminated structure or single ply material. In one example, the multi-ply structure can include five layers. Alternatively, the single ply material can include various materials, such as Kapton, polyolifins or polyester. Additionally, if the 0.001" layer is too thin to handle efficiently on the printing press and/or on other operations, then a thicker throw away support layer with a low tact pressure sensitive adhesive layer could be laminated to the thin substrate layer. Also, this 0.001" substrate layer could be made from more than one ply with a very thin oxide layer which performs as a water barrier on the inside surfaces. After the printing and assembly operations are completed, then the throw away support layer could be removed.

A second web could be a relatively thicker laminated structure including a PVC or Polyester film that is about 0.003-0.030" thick, and preferably about 0.006-0.015" thick. The second web can have a layer of pressure sensitive adhesive (without the release liner) at about 1-5 mils thick on one or both sides. After this laminated structure of the second web is completed, it can be applied to the first web. In addition or alternatively, the second web can be pattern cut using any type of mechanical means to allow for cavities for the cells active materials as well as an optional cavity for the cell/battery contacts. A third web can be a relatively thin laminated structure the same and/or similar to the first web. The completed three web structure may have a pressure sensitive adhesive on either side to allow the individual device assembly to be applied as a label. The cell/battery may be of the thin cell type, such as disclosed in co-pending application Ser. No. 11/110,202, filed on Apr. 20, 2005 and incorporated herein by reference, and/or the cells disclosed in U.S. Pat. No. 8,029,927, issued Oct. 4, 2011 and also incorporated herein by reference.

Depending on the cell construction, the cell application, and/or the cell environment, it may be advantageous to have different barrier properties for the substrate. Due to the wide range of available vapor transmission rates available, the barrier layer can be chosen for each specific application and construction, as desired. In some cases, for example where the cell by design has a higher gassing rate and/or a short life, it may be appropriate and desirable to use a film with a higher transmission rate to allow for a larger amount of gas to escape, so as to minimize cell bulging. The barrier layer is designed to minimize water loss but still allow generated gasses of normal electrochemical reactions to escape thus reducing the chances if the thin cell to bulge. Another example would be an application that has a long shelf life or is in a hot dry environment such as a desert. In such cases, it may be desirable to have a barrier film with low transmission rates to prevent excessive moisture loss from the cell. At least one of the first and second substrate layers can comprise a plurality of laminated layers including an oxide barrier layer having a gas transmission rate that permits gas to escape through said plurality of laminated layers of said first or second substrate layer, but still reduces (e.g., minimizes) the escape of water vapor.

Various embodiments of example constructions of the laminated film substrates can be utilized. The lower and upper laminated film layers can, in most cases and for most applications, be of the same materials. In at least one embodiment, these film layers can be comprised of a five-ply laminate film, for example, such as that supplied by Curwood Inc., a Bemis Corporation Company of Oshkosh, Wis. In another example, the laminated film substrates can have four layers. The top layer placed on the inside of the cell has an example thickness of about 0.48 mil thick (about 0.2-5.0 mil) and is a high moisture barrier polymer layer such as the GL films supplied by Toppan of Japan. These films provide a flexible, heat-sealable web that has the following barrier properties: oxygen transmission rate of less than about 0.045 cubic centimeters per 100 square inches per 24 hours at about 30 C and 70% relative humidity; and MVTR of between about 0.006-0.300 grams water per 100 square inches per 24 hours at about 40 C and 90% relative humidity.

Typically, this polyester film has an oxide or metalized coating on the inside of the laminated structure. These polymer (polyester)-based barrier films, which can have varying moisture transmission values depending on the type and the amount of vacuum deposited oxides, or metals, and can be laminated to the bottom polyester layer and which acts as a structural layer with a Urethane adhesive. The inside layer of these substrates can include a heat sealing layer. Another alternative high moisture barrier could be Curlam protective packaging film by Curwood. This is a flexible, heat-sealable web that has the following barrier properties: oxygen transmission rate of less than about 0.045 cubic centimeters per 100 square inches per 24 hours at about 73 F and 50% relative humidity; and MVTR of less than about 0.30 grams water per 100 square inches per 24 hours at about 100 F and 90% relative humidity.

In another example, an outside layer (or structural layer) of a multi-layer structure can include an about 2.0 mil (about 0.5-10.0 mil) layer of orientated polyester (OPET), which is laminated to the other layers by means of an urethane adhesive that is about 0.1 mil thick, for example. This "structural layer" can be a Dupont polyester orientated (OPET) film such as their Melinex brand, for example. Another material that can be used is from Toyobo Co. Ltd. of Japan. This material is a polyester based synthetic paper, which is designated as a white micro-voided orientated polyester (WMVOPET).

The use of a thicker substrate, by increasing any or all of the polymer thicknesses, may have some advantages: These may include one or both of the following: The cells process better on printing press due to the thicker substrate being less temperature sensitive; and The cell package is stiffer and stronger.

In addition to the above specifications, either or both the outside and the inside layers could include the addition of a print-receptive surface for the required inks. The inside layer is used for the functional inks (such as the collector and/or electrochemical layers) while the outside layer can be used for graphical inks, if desired. Flat cell constructions having a sealed system might utilize a laminated structure that includes metallized films and/or a very thin metal foil or foils as a moisture barrier. Although such structures using a metal layer might have better moisture barrier properties than the constructions used for some of the above described embodiments, it might also have some disadvantages. These may include one or more of the following: Laminated structures with metal barriers (thin metal foil or a vacuum metallized layer) are likely more expensive; Laminated structures with metal layers have the possibility of causing internal shorts; and Laminated structures that include a metal barrier could interfere with the electronics of an application, such as the functionality of a RFID antenna, for example.

The film substrates can be comprised of numerous variations of polymeric film, with or without a barrier layer (including metal or other materials), and can utilize either monolayer or multi-layer films, such as polyesters or polyolefin. Polyester is a good material to utilize because it provides improved strength permitting use of a thinner gauge film and is typically not easily stretched when used on a multi-station printing press. Vinyl, cellophane, and even paper can also be used as the film layers or as one or more of the layers in the laminated constructions. If a very long shelf life is desired, and/or the environmental conditions are extreme, the multi-ply laminate polymer could be modified to include a metallized layer such as obtained by vacuum deposition of aluminum in place of the oxide coating.

Alternately, a very thin aluminum foil could be laminated within the structure of the film layer, such as for layer, or in a different position. Such a modification could reduce already low water loss to practically nil. On the other hand, if the application is for a relatively short shelf life and/or a short operating life, a more expensive barrier layer could be replaced with a less efficient one which would be of a lower cost and still allow the cell to function for the required lifetime.

In applications where only an extremely short life is necessary, the cell package could instead use a film layer of a low cost polymer substrate such as polyester or polyolefin. It is possible that the pressure sensitive adhesive sealing system for adhering the frame to the top substrate and lower substrate could be replaced with a heat sealing system on the laminates.

In a simplified construction of the upper and/or lower laminate substrates, laminate barrier layers could be laminated together with urethane adhesive layer, for example. Alternatively, a substrate could be provided with an additional layer that is a barrier coating on barrier layer. In addition, layers could be laminated together with urethane adhesive layer.

Alternatively, an example seven-layer laminate substrate could be used for the substrate of the cell. A heat sealing layer can be laminated to the previous structure using an adhesive layer. The approximate 50 gauge heat seal layer can be a composite layer that also includes a heat sealing coating such as amorphous polyester (APET or PETG), semi crystalline polyester (CPET), polyvinyl chloride (PVC), or a polyolefin polymer etc. on polymer film such as polyester. One such example material is the Ovenable Lidding (OL) films made by Dupont and designated as their OL series such as OL, OL2 or OL13, for example. This would thus make the top substrate and/or the bottom substrate of the previously described cell into a 7-ply construction. Depending on the thicknesses of the various layers, any of these structures (three-ply, four-ply, and seven-ply laminates, respectively), the total thickness of these laminates could be about 0.003" with a range of about 0.001-0.015" for at least some embodiments. Alternatively, different substrate constructions could be utilized as well, including more or less layers, depending on the desired applications and qualities.

The various conductive inks described herein could be based on many types of conductive materials such as carbon, silver, gold, nickel, silver coated copper, copper, silver chloride, zinc and/or mixtures of these. For example, one such material that shows useful properties in terms of conductivity and flexibility is Acheson Colloids silver ink (Port Huron, Mich.) PM046. Furthermore, various circuits, electrical pathways, antennas, etc. that might be part of the printed circuitry can be made by etching aluminum, copper or similar type metallic foils that are laminated on a polymer such as Kapton or polyester substrate. This could be done with many types (sizes and frequencies) of pathways and/or antennas whether they are etched or printed.

A thin printed flexible electrochemical cell includes a printed cathode deposited on a printed cathode collector (e.g., a highly conductive carbon cathode collector) with a printed or foil strip anode placed adjacent to the cathode. Electrochemical cells/batteries of this type are described in co-pending U.S. application Ser. No. 11/110,202 filed on Apr. 20, 2005, Ser. No. 11/379,816 filed on Apr. 24, 2006, Ser. No. 12/809,844 filed on Jun. 21, 2010, Ser. No. 13/075,620 filed on Mar. 30, 2011, and Ser. No. 13/625,366 filed on Sep. 24, 2012, as well as issued U.S. Pat. Nos. 8,029,927, 8,268,475, 8,441,411, the disclosures of which is incorporated herein by reference. The electrochemical cell/battery can also include a viscous or gelled electrolyte that is dispensed onto a separator that covers all or part of the anode and cathode, and a top laminate can then be sealed onto the picture frame. This type of electrochemical cell was designed to be easily made by printing (e.g., through use of a printing press), and allows, for example, for the cell/battery to be directly integrated with an electronic application.

Turning now to FIG. 1, a flexible battery 10 for generating an electrical current is shown in a top, partial detail view. Though not explicitly stated, the flexible battery 10 can include any of the battery structure or methodology described herein. The flexible battery 10, including both (or more) cells, is printed on a single side of a single substrate (the top substrate is not shown in FIG. 1 for clarity). It is understood that various portions of the battery could be printed on opposite sides of a substrate, although it can be more cost effective to print the battery on a single side of a substrate. Additionally, though the battery can be formed using a printing process for each element, some or all of the elements can be provided via a non-printed process, such as laminates, adhesives, strips of material, etc.

Figure 2:
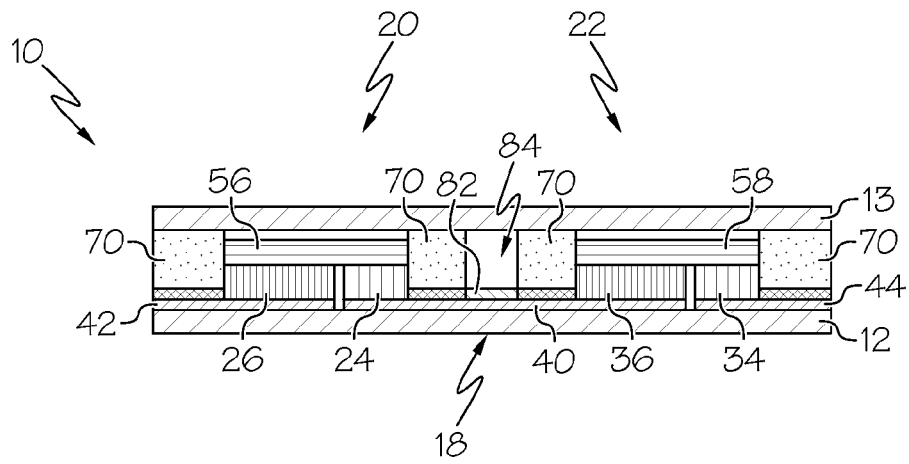
FIG. 2 illustrates a sectional view of FIG. 1 along line 2-2.

The flexible battery 10 comprises a first substrate layer 12 comprising a first cell portion 14, a second cell portion 16, and a bridge portion 18 connecting the first and second cell portions 14, 16. A first electrochemical cell 20 is provided on the first cell portion 14, and a second electrochemical cell 22 is provided on the second cell portion 16. It is understood that the first and second electrochemical cells 20, 22 are on or integrating the first substrate 12 such that the flexible battery 10 can be disposed directly or indirectly on the substrate 12, and/or can integrate the substrate 12 into the battery construction. In various examples, the flexible battery 10 can be manufactured (i.e., printed) directly or indirectly on the first substrate 12, or can even be separately manufactured (wholly or partially) and then attached directly or indirectly to the first substrate 12. In one embodiment, the first substrate 12 is a laminated film. The flexible battery 10 further comprises a second substrate layer 13 being connected to said first substrate layer 12 and arranged in a covering relationship over the first substrate 12. To provide greater clarity, flexible battery 10 in FIG. 1 is shown with the second substrate layer 13 removed, although it is shown in FIG. 2. The second substrate layer 13 can also be a single or multi-layer laminated film. It is contemplated that the second substrate layer 13 could be used as the top layer of the battery 10, and/or that some or all elements of the first and/or second electrochemical cells 20, 22 can be on or integrating the second substrate 13.

The first and/or second substrates 12, 13 can be a material that includes a plurality of laminated layers. The plurality of laminated layers can include a structural layer having an integrated barrier and/or a heat sealing layer, such as any described herein. The plurality of laminated layers can include any or all of an inner layer including a polymer film and/or a heat sealing coating, a high-moisture barrier layer, a first adhesive layer for connecting said inner layer to said high-moisture barrier layer, an outer structural layer including an orientated polyester, and/or a second adhesive layer for connecting said high-moisture layer to said outer structural layer. The high-moisture barrier layer can include an oxide coated moisture barrier layer that non-hermetically seals the battery against moisture, and may not include a metal foil layer. The plurality of laminated layers could optionally include a metalized layer.

The first electrochemical cell 20 further comprises a first anode 24 and a first cathode 26, while the second electrochemical cell 22 further comprises a second anode 34 and a second cathode 36, any or all of which can be provided as layers. The anode and cathode of each unit cell can be printed in a co-planar arrangement. The anodes and cathodes can be comprised of cured or dried inks. In various examples, the cathodes can be printed using an ink that includes one or more of manganese dioxide, carbon, NiOOH, silver oxides Ag2O and/or AgO, HgO, oxygen O2 in the form of an air cell, and Vanadium oxide VO2. The anodes can be printed using an ink that includes one or more of zinc, nickel, cadmium, metal hydrides of the AB2 and the AB3 types, iron, and FeS2. Still, the anodes and/or cathodes can be provided via a non-printed process, such as laminates, adhesives, strips of material, etc. In an alternative example, the anodes can be provided as a zinc foil PSA laminate, either of which can be made with corresponding geometry to match the cell geometry and about 0.002" (0.001"-0.010") thick.

Figure 1B:
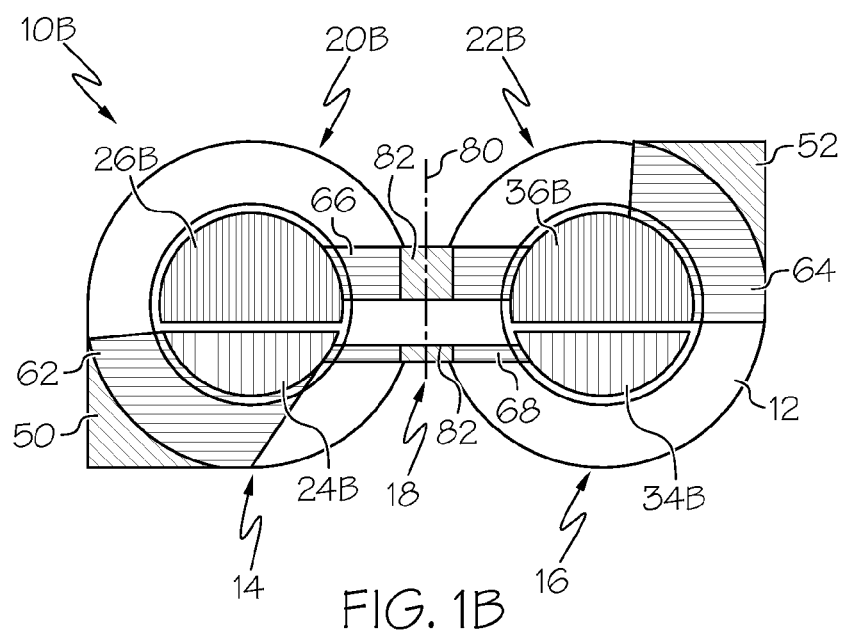
FIG. 1B illustrates a top, partial detail view of another example flexible multi-cell battery according to another embodiment of the instant application.
Figure 5:
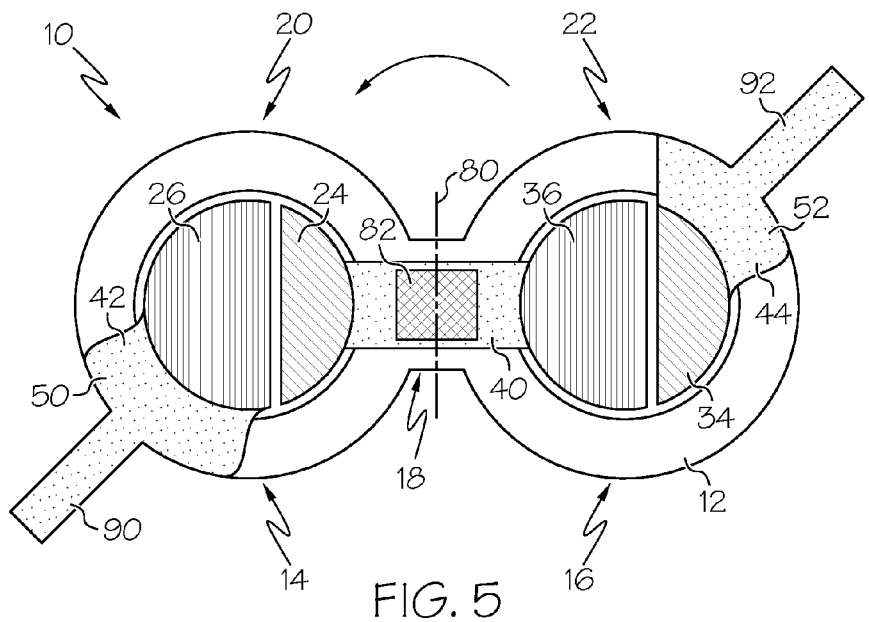
FIG. 5 illustrates a top, partial detail view of a second example multi-cell battery according to another embodiment of the instant application.

Additionally, the flexible battery 10 can comprise at least one electrical bridge that electrically couples the first electrochemical cell 20 to the second electrochemical cell 22 in series or parallel. The electrical bridge is flexible and extends across the bridge portion 18 of the first substrate layer 12. In one example, the electrical bridge comprises a carbon junction bar that is provided (such as printed) to electrically couple the cells in various arrangements. The electrical bridge electrically couples one of the first anode 24 and first cathode 26 of the first electrochemical cell 20 to one of the second anode 34 and second cathode 36 of the second electrochemical cell 22. For example, the electrical bridge can extend between the anode of one cell and the cathode of the other cell in a series arrangement (e.g., 1.5 volts×2 cells=3 volts), as shown in FIGS. 1-2, or alternatively electrical bridge can extend between the anode or cathode of one cell and to the corresponding anode or cathode, respectively, of the other cell to electrically couple the cells in a parallel arrangement (e.g., 1.5 volts×2 cells=1.5 volts with increased electrical capacity), as shown in FIG. 1B.

The flexible battery 10 can further comprise one or more current collectors provided on the first substrate 12 and underneath any or all of the anodes and cathodes 24, 26, 34, 36. In one example, shown in FIG. 1, a current collector layer 40 is provided at least partially on both of the first and second cell portions 14, 16 of the first substrate layer 12, and extending across the bridge portion 18. In order to electrically couple the first and second electrochemical cells 20, 22, one of the cathode layer 26 and anode layer 24 of the first electrochemical cell 20, and one of the cathode layer 36 and anode layer 34 of the second electrochemical cell 22, are both provided on the current collector layer 40. That is, the current collector layer 40 is provided underneath both of said one of the first cathode and first anode of the first electrochemical cell and said one of the second cathode and second anode of the second electrochemical cell. For example, in a series connection, as shown in FIG. 1, between the first and second electrochemical cells 20 and 22, the anode layer 24 of the first electrochemical cell 20 and the cathode layer 36 of the second electrochemical cell 22 are both provided on the current collector layer 40, or vice-versa. Thus, the current collector layer 40 that extends across the bridge portion 18 provides the electrical connection between the first and second electrochemical cells 20, 22.

The current collector layer 40 can be provided via a dried or cured ink (e.g., printed), or can be provided via a non-printed process, such as laminates, adhesives, strips of material, etc. Indeed, all of the current collectors, anodes, and cathodes can be provided as cured or dried inks. Generally, the current collector layer 40 is provided as a different material from the anodes and cathodes. Additional current collectors can be provided under the remaining cathode and anode. The anode and cathode of each cell can be printed, respectively, on each of the cathode collector and/or anode collectors. For example, as shown in FIGS. 1-2, the first cathode 26 of the first electrochemical cell 20 can be provided on top of a cathode current collector 42, while the second anode 34 of the second electrochemical cell 22 can be provided on top of an anode current collector 44. The various elements of each cell can be printed in various orders. It is contemplated that any or all of the current collectors can be provided directly upon the first substrate 12, in the same printing station, although any or all of the current collectors could be provided on top of optional intermediate layers (not shown).

The flexible battery 10 can further comprise a first electrode contact 50 that is electrically coupled to the first electrochemical cell 20, and a second electrode contact 52 that is electrically coupled to the second electrochemical cell 22. In one example, the first electrode contact 50 is electrically coupled to the cathode layer 26 of the first electrochemical cell 20, as illustrated in FIG. 1. Additionally, the second electrode contact 52 can be coupled to anode layer 34 of the second electrochemical cell 22, as also illustrated in FIG. 1. An extended area of the underlying cathode and/or anode collectors 42, 44 can provide the first and second electrode contacts 50, 52 as positive and negative electrode extensions. Either or both of the first and second electrode contacts 50, 52 can have an optional layer provided thereon (e.g., printed) to strengthen and/or increase the electrical conductivity thereof, such as a relatively flexible silver ink. Alternatively, in the case where the negative electrode is a foil any or all of the electrode extensions can be a continuation of the foil. Generally, for a two-cell battery, these external electrode contacts 50, 52 are printed on opposite cells to provide one cathode collector extension and one anode collector extension to enable the flexible battery 10 to be easily connected to an active device to be powered by the battery. However, it is contemplated that if the carbon of the first and second electrode contacts 50, 52 is proven to have sufficient flexibility and/or conductivity for the application, then the silver conductive layer may not be needed.

As previously described, the first and second electrochemical cells 20, 22 can alternatively be arranged in a parallel configuration (e.g., 1.5 volts with increased electrical capacity, increased discharge time, and/or higher currents). It is contemplated that in a parallel arrangement, two or more electrical bridges can be utilized. For example, turning briefly to FIG. 1B, the flexible battery 10B is illustrated in a parallel cell arrangement. The first and second cathodes 26B, 36B are connected by one electrical bridge 66, while the first and second anodes 24B, 34B are also connected by another, separate electrical bridge 68. Each of the electrical bridges 66, 68 can be similar to the common current collector 40 described above in the series configuration, and either or both can also include a flexible silver ink or the like. The electrical bridges 66, 68 can be separated by an empty space, or by a physical spacer. Both of the first and second anodes 24B, 34B are preferably provided on top of anode current collectors, with one anode current collector 62 extending to an electrode contact 50. Similarly, both of the first and second cathodes 26B, 36B are preferably provided on top of cathode current collectors, with one cathode current collector 64 extending to an electrode contact 52. Although only two cells are illustrated, it is contemplated that more than two cells could be arranged in a parallel configuration to increase the electrical capacity of the flexible battery even further.

The flexible battery 10, shown in FIG. 2, further comprises first and second liquid electrolytes 56, 58 provided, respectively, in contact with the first and second electrochemical cells 20, 22. The anodes and cathodes of the first and second electrochemical cells 20, 22 interact through the electrolytes 56, 58 to create an electrical current. A separate electrolyte layer comprising a liquid electrolyte can be placed in covering and in electrical contact with both of the anode and cathode of each electrochemical cell 20, 22. The electrolytes can include one or more of: zinc chloride, ammonium chloride, zinc acetate, zinc bromide, zinc Iodide, zinc tartrate, zinc per-chlorate, potassium hydroxide, and sodium hydroxide. The liquid electrolyte layers 56, 58 can comprise a polymeric thickener comprising one or more of polyvinyl alcohol, a starch, a modified starch, ethyl and hydroxyl-ethyl celluloses, methyl celluloses, polyethylene oxides, and polyacryamides. Additionally, the electrolyte layer can further comprise an absorbent paper separator. As described herein, electrolytes 56, 58 are a viscous or gelled electrolyte. If the electrolyte is not part of the gelled coating, a cell electrolyte is provided to an absorbent material such as a "paper separator" that covers or partially covers the anode and cathode pair. To provide greater clarity, the electrolytes, 56, 58 are not shown in FIG. 1, but are shown in FIGS. 2 and 9F. The electrolytes can be an aqueous solution of $ZnCl_2$ at weight percent of about 26-27% (about 23%-43%) that could also contain a thickener, such as carboxymethylcellulose (CMC) or other similar materials at about 0.6% level (about 0.1%-2%). Any of the electrolytes can include an additive to prevent or reduce gassing in the electrochemical cell (e.g., prevent or reduce the generation of hydrogen gas in the cells).

Optionally, for some embodiments, the first substrate layer 12 and the second substrate layer 13 can be connected via one or more optional frames disposed therebetween. For example, after the anode and cathode of each electrochemical cell are in place, the optional cell "picture frame" can be added to act as a spacer. This could be done using a number of different methods. One method is to print this cell picture frame with a dielectric ink, for example, such as a cured or dried adhesive ink. Another method is to utilize a polymer sheet, stamped, die cut, laser cut or similar methods to form the appropriate "pockets" (inner space or spaces) to house materials of each unit cell. In the simplified construction being discussed here, the picture frame could comprise a die cut polymer laminate sheet, such as a polyester or polyvinyl chloride (PVC), etc., in the middle and having two outside layers of pressure sensitive adhesive with release liners (e.g., top surface and bottom surface). The top PSA layer adheres and seals the top laminate substrate to the picture frame and bottom PSA layer can be used to adhere and seal the bottom laminate substrate to the picture frame. Alternatively, the picture frame could be replaced by a printed or laminated adhesive provided in the shape of the above-described frame.

Generally, when stamped frames are used, each "picture frame" has a total thickness (excluding the thickness of the liners) of about 0.010" (about 0.005"-0.50"). The "picture frame" can be placed on the first substrate layer 12 after removing a bottom release liner so that the anode and cathode are centered within the frame. When a printed frame is used, they are generally much thinner with a thickness of about 0.002" (e.g., about 0.0005"-0.005"). In some cases, to ensure a leak-free construction, a sealing and/or caulking adhesive, a heat sensitive sealant, and/or double sided PSA tape can be placed and/or printed on top of the anode layer and on top of cathode collector in an area that falls under the picture frame. The sealing adhesive can also be provided underneath the remainder of the picture frame.

In the various shown examples the "picture frame" can have an exterior geometry that generally corresponds to the overall geometry of the battery, and an interior area that generally provides an inner space for each electrochemical cell. It is understood that for brevity, two different example picture frame configurations are shown as alternatives in FIGS. 9E-9F. In the shown example of FIG. 9F, the "picture frame" 70 can have an approximately figure-8 geometry, with a rectangular extension that extends along the bridge portion 18 of the first substrate layer 12. Alternatively, a plurality of "picture frames" 72, 74 can be utilized such that each electrochemical cell 20, 22 is provided with a separate and independent picture frame, such as shown in FIG. 9E. Preferably, if an optional "picture frame" is used, it is attached to the first substrate layer 12 before the electrolyte is added such that the electrolyte is substantially, such as completely, contained by the "picture frame."

Figure 3:
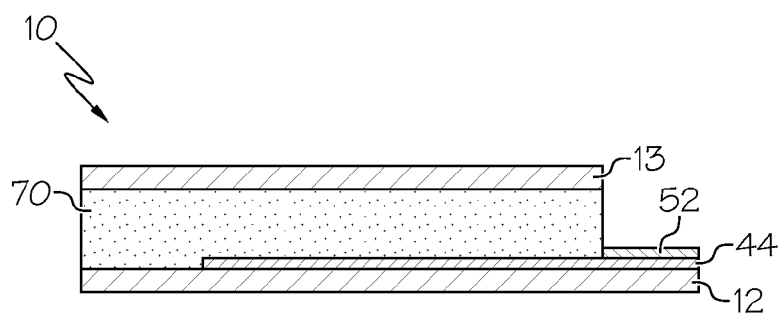
FIG. 3 illustrates a sectional view of FIG. 1 along line 3-3.

The flexible battery 10 is completed by applying and sealing a second substrate layer 13 over the first substrate layer. The second substrate layer 13 is connected to said first substrate layer 12 to contain each of said first and second liquid electrolytes 56, 58 such that both of the first and second electrochemical cells 20, 22 are separately sealed. If present, the second substrate layer 13 can be sealed over the optional picture frame 70 as shown in FIGS. 2 & 3. Prior to applying the second substrate layer 13, a release liner, if present (not shown), is removed from an adhesive layer on top of the picture frame 70. In another example, a printed adhesive can be used to connect the first and second substrate layers 12, 13. Additionally, the printed adhesive may extend over and cover at least a portion of the anode and/or cathode layers. In another example, the first and second substrate layers 12, 13 can be directly connected to each other without an intermediate adhesive or picture frame. It is also contemplated that where a picture frame is not utilized, the second substrate layer 13 is connected to said first substrate layer 12 to form first and second inner spaces, respectively, containing each of said first and second liquid electrolytes 56, 58.

When the second substrate layer 13 is sealed over the first substrate layer 12, an outer seal area is formed. The seal area inhibits, such as prevents, the liquid electrode from leaking out of each cell. Preferably, each electrochemical cell 20, 22 is individually sealed. The width of the seal area can vary based on the overall size and geometry of the battery. In one example, the seal area can have a minimum width of about 0.075 inches. The maximum width can vary based on the various batteries, and can be as large as 0.250 inches, or even greater. This battery construction with the same geometries can also be made without the frame in high volumes with a commercial pouch filling machine. It is contemplated that the seal area may be substantially the same around the perimeter of each cell, or may differ along the perimeter of each cell as desired.

Once the flexible battery 10 is completed, it is configured to be folded over itself along the bridge portion 18 as shown in FIGS. 1, 1B & 2, such that the first and second electrochemical cells 20, 22 are arranged in a covering relationship. The first and second electrochemical cells 20, 22 can be arranged to substantially extend (e.g., coincide) over each other, or may only partially extend over each other. For example, the flexible battery 10 can be folded over itself about a fold-over line 80. This line 80 can be located about half-way along the length of the battery 10, such as generally over the bridge portion 18 of the first substrate layer 12. The fold-over line 80 can be located generally at the center of the bridge portion 18, although other locations may be utilized to achieve a desired finished flexible battery 10 finished shape. The flexible battery 10 is folded over itself to provide a finished battery with multiple cells having a surface area substantially similar to that of battery with a single cell. The top or bottom substrate, depending on which way the battery is folded, can include an exterior adhesive (e.g., PSA) such that when the battery is folded over itself it remains in a folded condition.

When the flexible battery 10 is folded over the fold-over line 80 that extends through the bridge portion 18, the electrical bridge 40 (e.g., the common collector layer that electrically couples the two electrochemical cells) is similarly folded-over. The carbon junction bar may be relatively brittle at the fold-over junction. Thus, a flexible conductive layer 82 as shown in FIGS. 1, 1B & 2 can be provided on top of the electrical bridge 40 in the area of the bridge portion 18 to thereby mechanically and/or electrically strengthen the electrical bridge 40. For example, a relatively flexible silver ink can be printed on top of the carbon electrical bridge 40 about the fold-over line 80 of the first substrate layer. The flexible silver ink can strengthen and/or increase the electrical conductivity of the carbon electrical bridge 40 once the first substrate layer 12 is in a folded condition. However, it is contemplated that if the carbon electrical bridge 40 is proven to have sufficient flexibility and/or conductivity for the application, then the silver conductive layer 82 may not be needed.

In order to facilitate the folding-over of the flexible battery 10 over itself along the line 80 extending through the bridge portion 18, an open gap area 84 can be disposed between the first substrate layer 12 and second substrate layer 13, and over the bridge portion 18 of the first substrate 12. The open gap area 84 can be arranged about the fold-over line 80 to reduce the local structural support such that the flexible battery 10 more easily folds over. The open gap area 84 may also provide a space to receive portions of the first substrate layer 12, or other portion(s) of the flexible battery 10, during the folding over procedure. In another example, a portion of the optional "picture frame" 70 can be at least partially (or even completely) removed about the fold-over area to facilitate the fold-over operation and/or to reduce material stress. Thus, the optional picture frame 70 can comprise the open gap 84 (see FIGS. 2 & 9F) disposed between the first substrate layer 12 and second substrate layer 13, and over the bridge portion 18 of the first substrate 12. Thus, the open gap 84 of the picture frame 70 can similarly facilitate folding the flexible battery 10 over itself along the fold-over line 80 extending through the bridge portion 18. The open gap 84 of the picture frame 70 can extend variously along the bridge portion 18, such as partially or substantially completely. In one example, the open gap 84 can have an internally bounded geometry, such as a square, rectangle (see FIG. 9F), circular, oval, polygonal, or other geometry. The open gap 84 through the picture frame 70 can have various sizes, such as ⅛" to about ¼" wide, although other sizes are contemplated.

Figure 4:
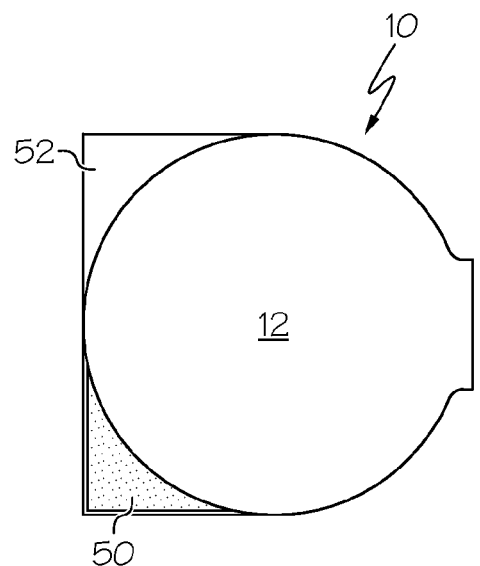
FIG. 4 illustrates an example finished assembly of the multi-cell battery after folding of FIG. 1.

The use of a single printing process, while useful to reduce time and costs, also results in all of the printing being done on the same surface. Thus when the flexible battery 10 is folded in half, as described above, the battery contacts are exposed inwards in opposite directions. One example is illustrated in FIG. 4, and this configuration provides a battery with an approximately "D"-shaped geometry. For example, the first electrode contact 50 is illustrated as pointing upwards, while the second electrode contact 52 is illustrated as pointing downwards (e.g., opposite).

Turning now to FIGS. 5-8, it can be beneficial to further reduce the overall size of the flexible battery 10, as well as providing more choices to make electrical contact to the circuit. As shown in these examples, the flexible battery 10 can have a configuration with an approximately circular-shaped geometry (or various other geometries). However, this configuration may reduce the area for the electrode contacts. Thus, either or both of the electrode contacts 50, 52 can extend a distance outwards from the associated electrochemical cell. In one example, either or both of the electrode contacts 50, 52 can have a contact extension 90, 92 that projects a distance out from the each electrochemical cell. Various example sizes and shapes of contact extensions are illustrated in FIGS. 5-8. It is understood that various other sizes, shapes, numbers, and locations of contact extensions are contemplated.

Figure 6:
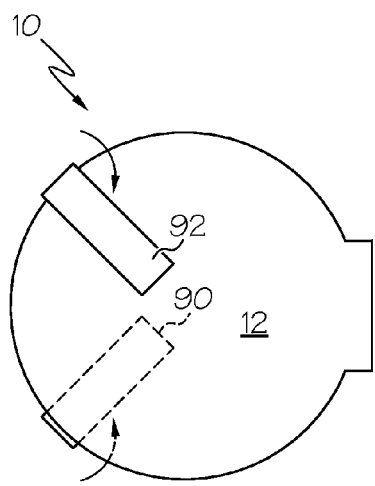
FIG. 6 illustrates an example finished assembly of the multi-cell battery of FIG. 5.

Still, to manage the overall size of the folded-over battery and location and types of contacts, either or both of the contact extensions 90, 92 can be configured to be folded over one of the first and second substrates 12, 13. For example, as shown in FIG. 6, the contact extensions 90, 92 can be folded in outward directions and backwards onto the first and second substrates 12, 13 so as to expose the contacts surfaces outwards to permit easy electrical contact to the desired electrical circuit. Thus, one contact extension 92 is located on top of the folded battery, while the other contact extension 90 is located on the bottom of the folded battery. The battery can be coupled to an electrical circuit by permanently or non-permanently connecting to these contact extensions (e.g., soldering, welding, spring clips, conductive adhesives, etc.).

Figure 7:
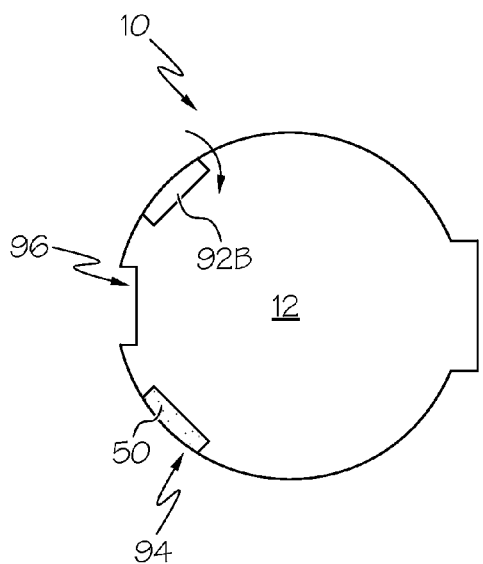
FIG. 7 illustrates an alternate example finished assembly of the multi-cell battery of FIG. 5.

Additionally, where overall battery size is limited, folding back the contact extensions 90, 92 can relocate the battery contacts to be within the overall battery envelope to thereby constrain the maximum battery size (e.g., surface area, etc.) including the contacts. These configurations thereby could permit the anode and cathode sizes to be relatively increased, such as maximized, for a particular overall battery envelope to thereby provide a relatively increased, such as maximized, battery capacity. It is further contemplated that the contact extensions 90, 92 could both be located on only one of the top or bottom of the folded battery, such as where portions of the battery are printed on opposite sides of the substrate by flipping over or rotating the substrate during the manufacturing or printing processes. The battery contacts could also include a combination of these contact designs so as to allow both contacts to be available on one side of the battery without printing on both sides of the substrate. In an additional example, shown in FIG. 7, at least one of the first and second substrates 12, 13 can comprise a cutout area 94 extending therethrough such that one of the first and second electrode contacts is exposed to the external environment through the cutout area 94. For example, as shown in FIG. 7, a cutout area 94 can extend through both of the first and second substrates 12, 13 of the second electrochemical cell 22 such that, once the battery is folded over, the electrode contact 50 (of the first electrochemical cell 20) is exposed to the external environment through the cutout area 94. Additionally, the second substrate 13 of the first electrochemical cell 20 could also have a similar cutout area that extends therethrough to expose the electrode contact 50. If present, the spacer 70 of either or both of the electrochemical cells 20, 22 can also have a corresponding cutout area therethrough such that the electrode contact 50 is exposed. Additionally, the contact extension 92B for the second electrode contact 52 can be folded backwards over the second substrate 13. Therefore, as shown in FIG. 7, both of the first and second electrode contacts 50, 52 (e.g., contact 50 directly, contact 52 via the contact extension 92B) are located on the same surface for connection to an electrical circuit. It is understood that such a construction may only utilize one contact extension (e.g., reference 92B), because the first electrode contact 50 is directly available through the cutout area 94, although an extension could be provided for contact 50 if desired. This type of construction may simplify integration of the flexible battery 10 into various electronic circuits.

In addition or alternatively, one or both of the first and second substrates 12, 13 can comprise an auxiliary cutout area 96 extending therethrough to make additional room for an electrical component. For example, as shown in FIG. 7, the auxiliary cutout area 96 can extend through both substrates 12, 13 and spacer 70 if used to provide a customized area configured to receive an electrical component, such as an LED, display, switch, microprocessor, sensor, speaker, etc. to further reduce the overall size of an electrical component assembly that includes the battery 10. Similarly, the overall shape and size of the flexible battery 10 could be customized to fit a desired electrical component assembly.

Figure 8:
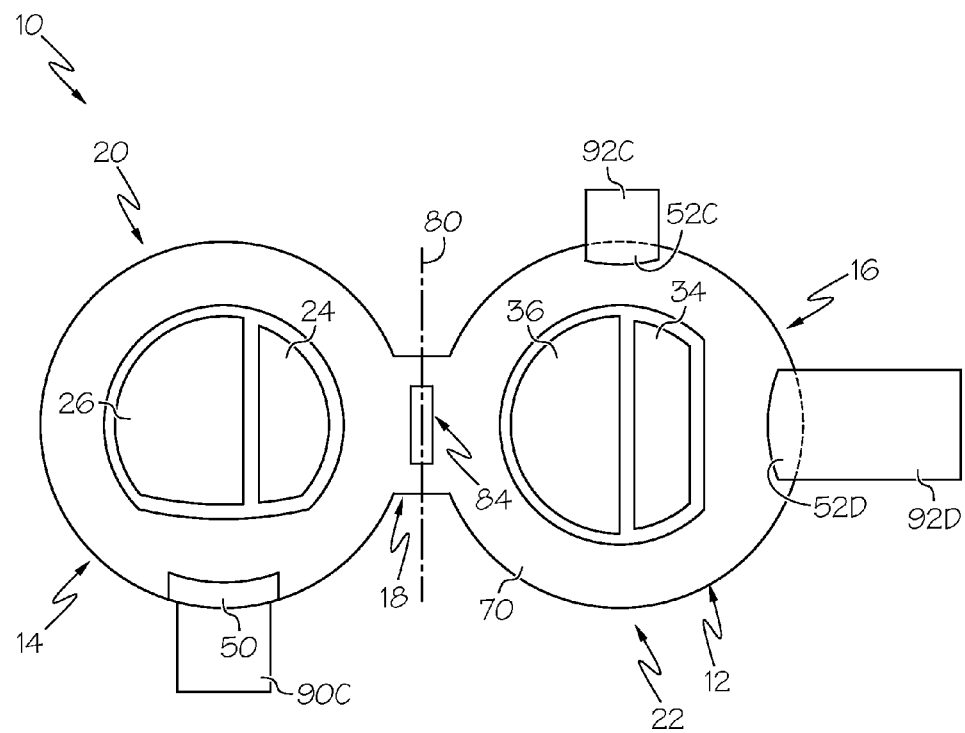
FIG. 8 illustrates a top, partial detail view of a third example multi-cell battery according to yet another embodiment of the instant application.

Turning now to FIG. 8, the flexible battery 10 can optionally include a plurality of electrode contacts and/or contact extensions for each electrochemical cell 20, 22. For example, the first electrochemical cell 20 can have a single electrode contact 50 with a single contact extension 90C. However, the second electrochemical cell 22 can have two electrode contacts 52C, 52D, each of which may include its own contact extension 92C, 92D. Thus, either of the electrode contacts 52C, 52D (or contact extensions 92C, 92D) can be used to receive electrical energy from the flexible battery 10. The purpose of this construction is to provide the end user with multiple options for integrating the same flexible battery 10 into multiple different electrical circuits. For example, one electrical circuit may be configured to connect to one of the electrode contacts 52C (or contact extension 92C), while another electrical circuit may be configured in such a way to connect to another of the electrode contacts 52D (or contact extension 92D). Either or both of the contact extensions 92C, 92D can be folded over the battery variously as desired, and/or the first or second substrates could include cutout areas as described herein to directly access one of the electrode contacts 52C, 52D.

The batteries described herein have a co-planar construction. A co-planar construction provides several advantages, in that they are easy to manufacture, provide consistent, reliable performance, and have their contacts on the same side of the cell/battery. Generally, each of the electrochemical cells described herein can provide about 1.5 volts. However, a number of the electrochemical cells can be electrically coupled together if higher voltages and/or high capacities are desired. For example, a 3 volt battery is obtained by connecting two 1.5 volt unit cells in series, although other voltages and/or currents can be obtained by using unit cells with different voltages and/or by combining different numbers of cells together either in series and/or in parallel. Different electrochemical systems could be customized for the different battery configurations. Preferably, if different cells are used to obtain higher voltages all of the cells in each battery should be of the same electrochemical system. Thus, applications using greater voltages can connect unit cells in series, whereas applications requiring greater currents and/or capacities, unit cells can be connected in parallel, and applications using both can utilize various groups of cells connected in series further connected in parallel. Thus, a variety of applications that use different voltages and currents can be supported using a variety of unit cell and/or battery configuration.

Example manufacturing schemes will now be discussed. It can be beneficial to print the entire battery, including all cells, in a single printing process to avoid the difficulty of later connecting the multiple cells together. The printing process can be partially or completely automated, and may utilize individual sheets or a roll-to-roll process. The individual batteries can be removed from the carrier for use.

To make the manufacturing process of a cell/battery more efficient and/or achieve greater economies of scale, the cell/battery can be manufactured using a generally continuous web in a reel-to-reel printing process to provide production at high speeds and low cost. An example manufacturing procedure is described in the following paragraphs. In this example procedure, the cell/battery proceeds through numerous stations that are compatible with a high-speed printing press running a roll-to-roll setup. Though not further described herein, the processing and assembly could be integrated with the manufacture of the flexible battery 10 or elements thereof to be powered by the battery, such as with the electrical component, etc.

According to available printing presses, the cells could be made with one pass, or multiple passes, on a given press, for example. As an example, two rows of individual cells on the web; however, the number of rows is limited only to the size of the unit cells and the maximum web width that the press can process. Because there may be numerous steps, thereby likely utilizing a long and complicated press, some of these steps, as well as some of the materials, could be modified and/or multiple passes of a press or multiple presses could be used. Some modified process summaries will be shown after the initial discussion is completed. Moreover, any or all of the printing steps can be performed by screen printing, such as by flat bed screens or even rotary screen stations. Additionally, one skilled in the art would realize that one printing press with more than five stations could be difficult to find and or to operate, and thus the following discussion of the process could occur on one or more presses or even multiple passes through one press.

During manufacturing, various optional operations may or may not occur. For example, the optional operations could include one or both of heat stabilization of the web and graphics printing (which could include logos, contact polarities, printing codes and the addition of registration marks on the outside surface of web). If these optional printing operations occur on the web, then the web can be turned over and the functional inks can be printed on the inside surface, (i.e., the heat seal layer).

One skilled in the art would realize that there are many methods, materials, and sequences of operations that could be used, and that more or less, similar or different, numbers of stations could also be utilized. Still, it is to be understood that the following process can also be utilized for the manufacture of various other integrated electrical devices. Further, for the purposes of clarity only one column of batteries will be described and illustrated with the understanding that such description can similarly apply to other columns. Moreover, it is to be understood that any or all of the following elements can include any of the various materials, chemical compositions, etc. described throughout this document. Additionally, the various steps are intended to be merely example steps, and it is to be understood that the steps can include various other steps, alternatives, etc. as discussed herein.

As discussed herein, any or all of the substrates can be provided as generally continuous webs that can be processed through a "reel-to-reel" style manufacturing process. For example, a first substrate can be provided as a generally continuous web from a source station, which can be a source roll or the like. Some or all of the various processing steps, such as, for example, the steps of providing said cathode and anode collectors, cathode layer, anode layer, contacts, optional frame, optional printed circuitry, etc., can then be performed by passing the generally continuous web through a printing station, or even multiple printing and/or converting stations. In addition or alternatively, the process can be adapted to pass the web through the printing station in multiple passes. Finally, the completed batteries and electrical displays on the generally continuous web can be collected at a take-up station, which can include a collection roll. Alternatively, the completed batteries can be provided on flat sheets with a plurality of batteries, such as 20 or more batteries per sheet.

Turning now to FIGS. 9A-9G, one example manufacturing operation will be discussed. Still, it is understood that more or less manufacturing steps can be used, such as any or all described herein, and the various steps may be performed in various orders. As shown, a substrate is chosen whose width is based on the capability of the printing press, the size if the batteries, and the volume of batteries desired. For simplification, the following description of the web width will be assumed to be wide enough for a single row of batteries, although it is understood that two or more batteries can be arranged in an array having various numbers of rows and columns. Additionally, some or all desired preliminary operations (if any) such as film stabilization, indicia printing on the web, etc., can already have been completed, or could also be performed during or at the end of the process.

Figure 9A:
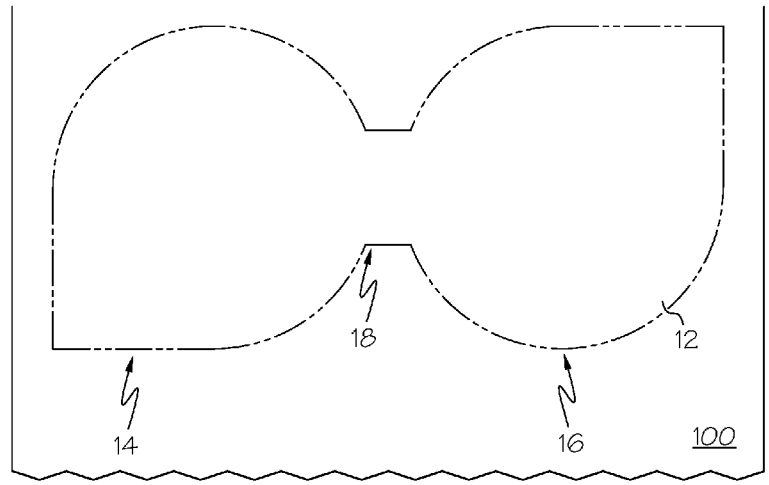
FIGS. 9A-9G illustrate example manufacturing steps of the multi-cell battery of FIG. 1.

Turning to FIG. 9A, a base substrate 100 is provided, and the outline of the single battery described herein is shown in phantom. Although a narrow web of substrate 100 is illustrated capable of printing one row of batteries and FIGS. 9A-9G illustrate the construction of a single battery for clarity, it is understood that a plurality of such batteries can be manufactured simultaneously on a reel-to-reel or sheet-based system. Thus, the illustrated construction steps can be repeated for all of the flexible batteries being produced on the reel-to-reel or sheet-based system (e.g., a sheet-based system may have 20-50 flexible batteries per sheet). Additionally, it may be beneficial to construct all of the batteries on the single roll or sheet first, and then cut-out or shape the completed individual batteries from the single roll or sheet first. Indeed, the material 100 forming the single roll or sheet may also form the first substrate 12 of the flexible battery 10, or the first substrate 12 can be fixed onto the single roll or sheet 100 (e.g., fixed to a carrier substrate). Thus, it is understood that although two reference numbers 12, 100 are shown in FIGS. 9A-9F, the base substrate 100 and the first substrate 12 of the flexible battery can be the same element, or even separate elements. Alternatively, the batteries can be cut-out or shaped first, such as by providing the first substrate 12 with the desired cut or shaped geometry.

Figure 9B:
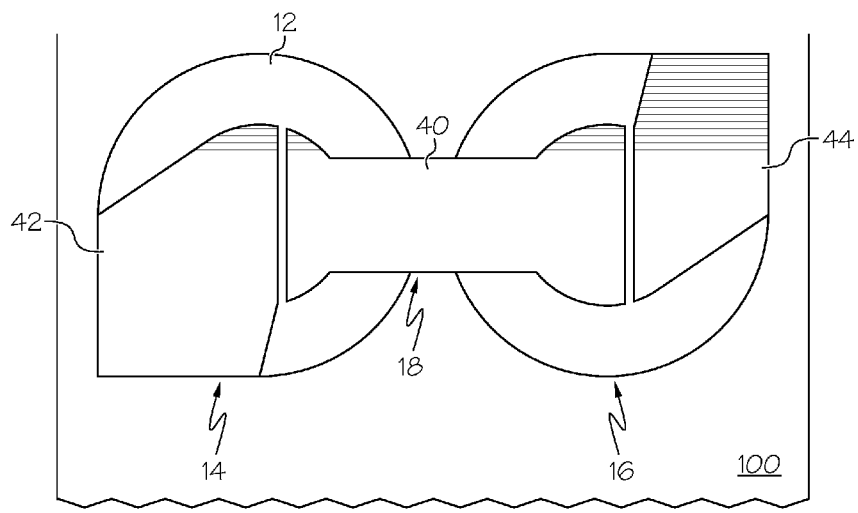

Next, in FIG. 9B, the carbon collector layers are provided. The cathode collector layer 42 can be provided, such as printed, on the first cell portion 14 of the first substrate 12, while the anode collector layer 44 can be provided, such as printed, on the second cell portion 16 of the first substrate 12. The collector layer 40 that acts as the electrical bridge as well as the anode collector layer for cell 20 and the cathode collector layer for cell 22 can also be can be provided, such as printed, to extend across the bridge portion 18 of the first substrate 12. These collectors may be printed simultaneously in one operation, or may be printed in two or more operations.

Figure 9C:
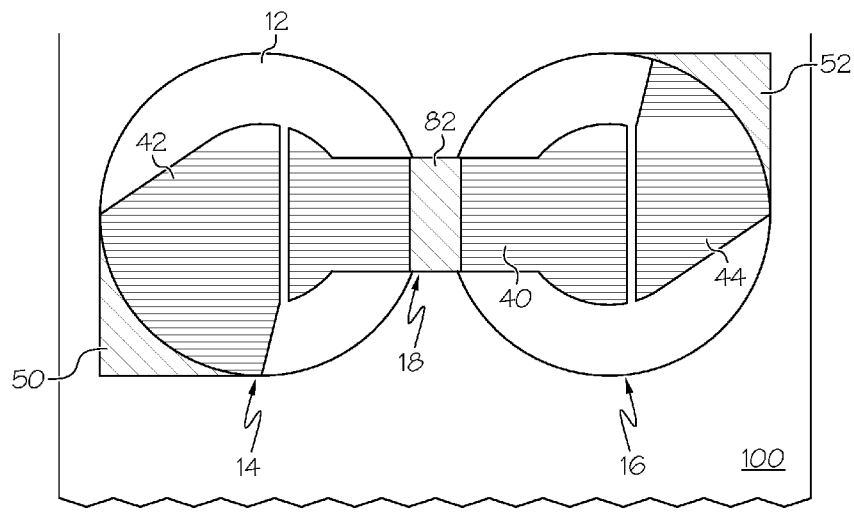
Figure 9D:
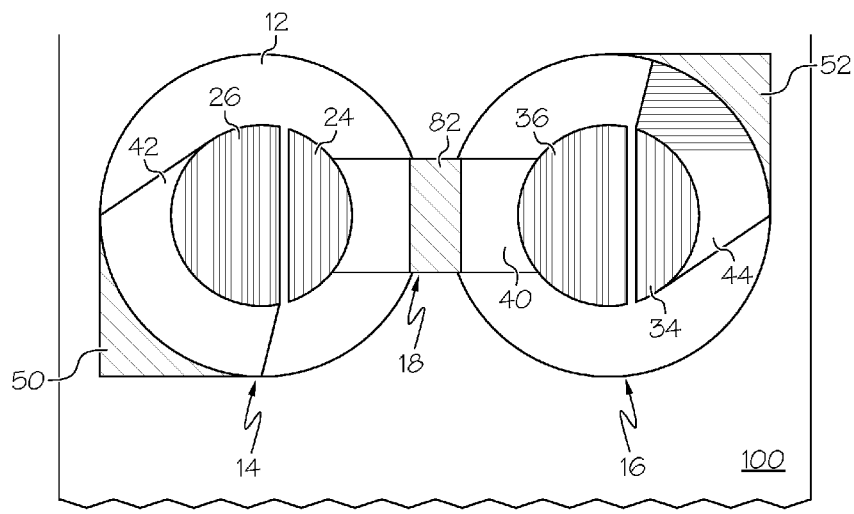
Figure 9E:
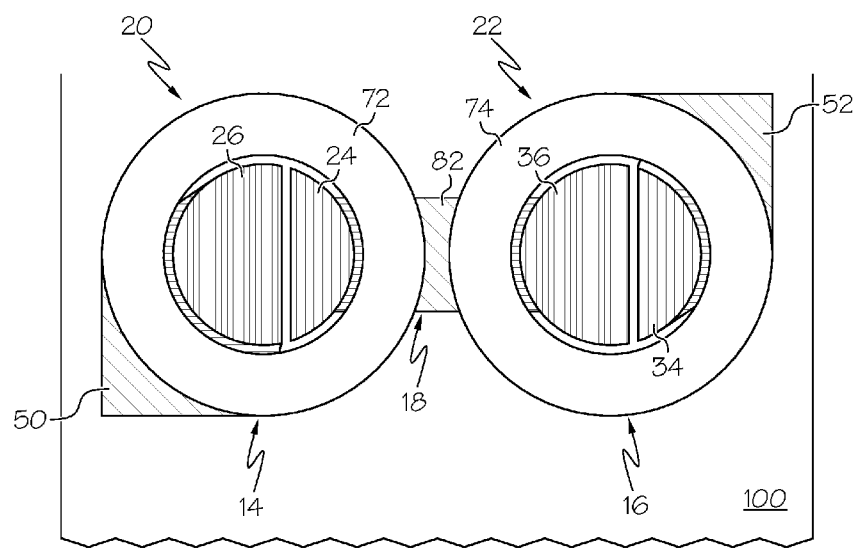
Figure 9F:
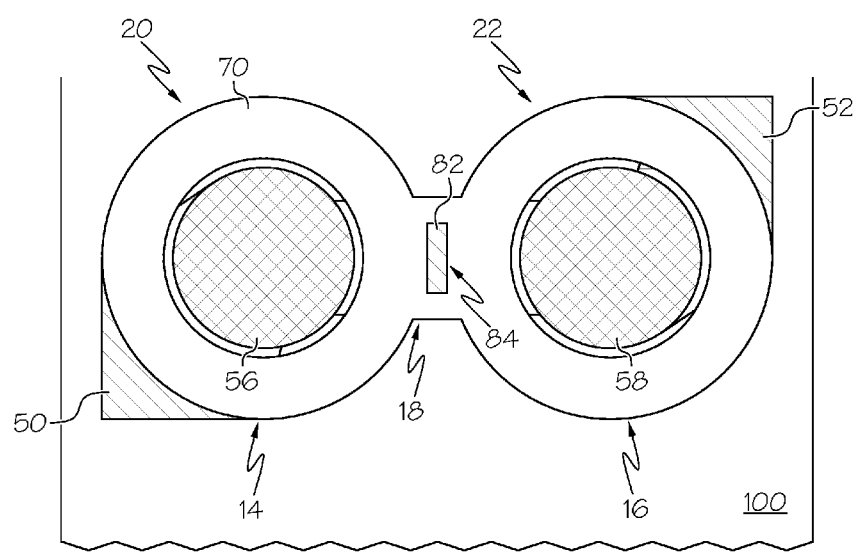

In FIG. 9C, optional conductive layers can be provided (e.g., printed) on any or all of the electrode contacts 50, 52 and the collector layer 40 that acts as the electrical bridge. For example, a silver ink or other flexible conductive ink may be used. Next, in FIG. 9D, the cathode and anode layers can be provided, such as printed. Although shown in the same step, it is understood that these cathodes and anodes may be printed simultaneously in one operation, or may be printed separately in two or more operations. The first cathode layer 26 can be printed on the cathode collector 42, while the second anode layer 34 can be printed on the anode collector 44. The first anode layer 24 and the second cathode layer 36 can both be printed on the collector layer 40 that also acts as the electrical bridge. While this construction provides a series configuration, it is contemplated that the electrochemical cells can be arranged in a parallel configuration in which case the cathode and anode layers, and the underlying collector layers, can be suitably arranged.

In FIG. 9E, one or more optional "picture frame" layers can be provided. Various types of frames can be provided as previously described (e.g., laminates, printed adhesives, etc.). As shown in FIG. 9E, a pair of frames 72, 74 can be separately provided over each electrochemical cell 20, 22. Alternatively, as shown in FIG. 9F, a single frame 70 can be provided (e.g., in the shape of a figure-8) with the open gap 84 disposed between the first substrate layer 12 and second substrate layer 13, and over the bridge portion 18 of the first substrate 12. It is understood that the frames 70, 72, 74 shown in FIGS. 9E-9F are intended to illustrate alternative examples.

Figure 9G:
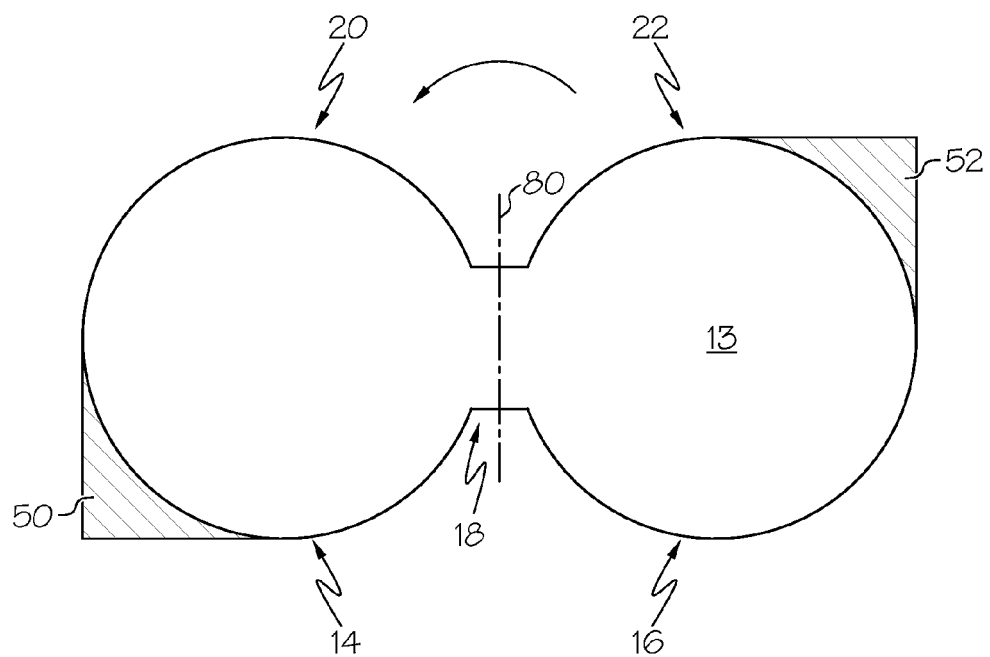

In FIG. 9F, the first and second electrolyte layers 56, 58 are provided to each electrochemical cell 20, 22 in a covering relationship over the associated cathodes and anodes, and within the bounds of the optional "picture frames" (if present). Next, in FIG. 9G, the second substrate layer 13 is secured and sealed to the first substrate layer 12 to thereby complete the flexible battery. A plurality of flexible batteries can be provided on a roll or in sheet form to an end user, and folded-over immediately prior to use, or they could be provided as unit batteries after they are blanked from substrate 12 as shown in FIG. 9G. Alternatively, each completed flexible battery can be folded-over itself along the fold-over line 80, as shown in FIG. 4, optionally secured, and provided to end users in this form. Optionally, contact extensions (if present) can similarly be folded over and secured.

The manufacturing process can include various other stages, steps, etc. For example, prior to or after the printing station, the web can pass through an auxiliary station wherein various electrical components could be provided. Moreover, any or all of the various layers, substrates, etc. can be provided by supplemental rolls along the process. For example, an additional substrate (i.e., a spacer layer) can be provided by a supplemental roll via a supplemental web. Though described as near the beginning of the printing station, it is to be understood that any or all of the supplemental webs can be provided at various locations along the manufacturing process. In addition or alternatively, waste material, such as release layers or the like, can be removed from as a waste web and taken-up by a waste roll or the like. Various other pre-processing and/or post-processing stations, steps, etc. can also be included. It is to be understood that the various stations, rolls, etc. of the described process can be utilized in various orders, and additional equipment may even be provided (e.g., idler rollers, tension rollers, turn-bars, slit or perforators, etc.) to facilitate a sheet-fed or reel-to-reel process.

Various other additional steps can be utilized to provide additional structure, features, etc. to the completed battery cells and electrical components. In one example, an outer portion of the device, such as either or both of the first or second substrates, can be provided with a method of attaching the battery cells to another object, surface, etc. For example, the substrate(s) can include a pressure sensitive adhesive, another adhesive layer, a hook-and-loop style fastener, a liquid or hot-melt adhesive, etc. In another example, an outer portion of the battery cells, such either or both of the first or second substrates, can be provided with printed indicia or even a label or the like.

Thin printed flexible batteries can have many potential applications, which can include one or more of the following generally categories as examples:

1. RFID assemblies;
2. Advertising and promotion;
3. Toys, novelties, books, greeting cards, and games;
4. Inventory tracking and control such as (smart RFID tags);
5. Security tags;
6. Condition indicators such as temperature, humidity, etc., with or without onboard memory storage, time stamping, and/or wireless transmission;
7. Skin patches that apply iontophoresis or other electrical function for the purpose of drug delivery, wound care, pain management and/or cosmetics;
8. Healthcare products such as smart diapers, incontinence products, etc.;
9. Temperature sensing patches using electronic temperature sensors with or without onboard memory storage, time stamping, and/or wireless transmission; and 10. Smart cards, with an integrated circuit, radio, audio/visual components, etc.

The invention has been described hereinabove using specific examples and embodiments; however, it will be understood by those skilled in the art that various alternatives may be used and equivalents may be substituted for elements and/or steps described herein, without deviating from the scope of the invention. Modifications may be performed to adapt the invention to a particular situation or to particular needs without departing from the scope of the invention. It is intended that the invention not be limited to the particular implementations and embodiments described herein, but that the claims be given their broadest interpretation to cover all embodiments, literal or equivalent, disclosed or not, covered thereby.

What is claimed is:

1. A flexible battery for generating an electrical current, comprising:
    a first substrate layer comprising a first cell portion, a second cell portion, and a bridge portion connecting the first and second cell portions;
    a first electrochemical cell on the first cell portion, comprising a first anode and a first cathode;
    a second electrochemical cell on the second cell portion, comprising a second anode and a second cathode;
    an electrical bridge that electrically couples the first electrochemical cell to the second electrochemical cell in series or parallel,
    wherein the electrical bridge is flexible and extends across the bridge portion of the first substrate layer;
    first and second liquid electrolytes provided, respectively, in contact with the first and second electrochemical cells; and
    a second substrate layer being connected to said first substrate layer to contain each of said first and second liquid electrolytes such that both of the first and second electrochemical cells are separately sealed,
    wherein the flexible battery is configured to be folded over itself along the bridge portion such that the first and second electrochemical cells are arranged in a covering relationship, and
    wherein said first substrate layer and second substrate layer are connected via a frame disposed therebetween.

2. The battery of claim 1, wherein the electrical bridge electrically couples one of the first cathode and first anode of the first electrochemical cell to one of the second cathode and second anode of the second electrochemical cell.

3. The battery of claim 2, wherein the electrical bridge comprises a current collector provided on said first substrate and underneath both of said one of the first cathode and first anode of the first electrochemical cell and said one of the second cathode and second anode of the second electrochemical cell.

4. The battery of claim 3, wherein all of said current collector, first and second cathodes, and first and second anodes are comprised of cured or dried inks.

5. The battery of claim 2, further comprising a flexible conductive layer provided on top of said electrical bridge to thereby mechanically and/or electrically strengthen the electrical bridge.

6. The battery of claim 1, further comprising a first electrode contact that is electrically coupled to the first electrochemical cell, and a second electrode contact that is electrically coupled to the second electrochemical cell.

7. The battery of claim 6, wherein at least one of the first and second electrode contacts extends a distance outwards and is configured to be folded over one of the first and second substrates.

8. The battery of claim 6, wherein one of the first and second substrates comprises a cutout area extending therethrough such that one of the first and second electrode contacts is exposed through the cutout area.

9. The battery of claim 1, wherein said frame comprises an open gap disposed between the first substrate layer and second substrate layer, and over the bridge portion of the first substrate, to thereby facilitate folding the flexible battery over itself along a line extending through the bridge portion.

10. The battery of claim 9, wherein said frame comprises a cured or dried adhesive ink.

11. A flexible battery for generating an electrical current, comprising:
    a first substrate layer comprising a first cell portion, a second cell portion, and a bridge portion connecting the first and second cell portions;
    a current collector layer provided at least partially on both of the first and second cell portions of first substrate layer, and extending across the bridge portion;
    a first cathode layer and a first anode layer provided on the first cell portion of the first substrate to form a first electrochemical cell;
    a second cathode layer and a second anode layer provided on the second cell portion of the first substrate to form a second electrochemical cell,
    wherein one of the cathode layer and anode layer of the first electrochemical cell, and one of the cathode layer and anode layer of the second electrochemical cell, are both provided on the current collector layer;
    a first electrode contact coupled to one of the cathode layer and anode layer of the first electrochemical cell;
    a second electrode contact coupled to one of the cathode layer and anode layer of the second electrochemical cell;
    first and second liquid electrolytes provided, respectively, in contact with the first and second electrochemical cells; and
    a second substrate layer being connected to said first substrate layer to form first and second inner spaces, respectively, containing each of said first and second liquid electrolytes,
    wherein the flexible battery is configured to be folded over itself along the bridge portion such that the first and second electrochemical cells are arranged in a covering relationship over each other, and
    wherein said first substrate layer and second substrate layer are connected via a frame disposed therebetween.

12. The battery of claim 11, wherein all of said cathode current collector, first and second cathodes, and first and second anodes are comprised of cured or dried inks.

13. The battery of claim 11, further comprising a flexible conductive layer provided on top of said current collector layer to thereby mechanically and/or electrically strengthen the current collector layer over the bridge portion.

14. The battery of claim 11, wherein at least one of the first and second electrode contacts extends a distance outwards and is configured to be folded over one of the first and second substrates.

15. The battery of claim 11, wherein one of the first and second substrates comprises a cutout area extending therethrough such that one of the first and second electrode contacts is exposed through the cutout area.

16. The battery of claim 11, wherein said frame comprises an open gap disposed between the first substrate layer and second substrate layer, and over the bridge portion of the first substrate to thereby facilitate folding the flexible battery over itself along a line extending through the bridge portion.

17. A flexible battery for generating an electrical current, comprising:
   a first substrate layer comprising a first cell portion, a second cell portion, and a bridge portion connecting the first and second cell portions;
   a first electrochemical cell on the first cell portion;
   a second electrochemical cell on the second cell portion;
   an electrical bridge that electrically couples the first electrochemical cell to the second electrochemical cell in series or parallel,
   wherein the electrical bridge is flexible and extends across the bridge portion of the first substrate layer;
   first and second liquid electrolytes provided, respectively, in contact with the first and second electrochemical cells; and
   a second substrate layer being connected to said first substrate layer to contain each of said first and second liquid electrolytes such that both of the first and second electrochemical cells are separately sealed,
   wherein the flexible battery is configured to be folded over itself along the bridge portion such that the first and second electrochemical cells are arranged in a covering relationship; and
   an open gap area disposed between the first substrate layer and second substrate layer, and over the bridge portion of the first substrate, to thereby facilitate folding the flexible battery over itself along a line extending through the bridge portion.

18. The battery of claim 17, wherein said first substrate layer and second substrate layer are connected via a frame disposed therebetween that separately encloses each of said first electrochemical cell and said second electrochemical cell, and wherein said frame extends along the bridge portion of the first substrate and comprises said open gap.

19. The battery of claim 1, wherein the electrical bridge comprises a current collector layer provided at least partially on both of the first and second cell portions of first substrate layer, and extending across the bridge portion.

20. The battery of claim 19, wherein one of the cathode layer and anode layer of the first electrochemical cell, and one of the cathode layer and anode layer of the second electrochemical cell, are both provided on the current collector layer.

21. The battery of claim 19, wherein all of said current collector layer, first and second cathodes, and first and second anodes are comprised of cured or dried inks.

22. The battery of claim 19, further comprising a first electrode contact that is electrically coupled to the first electrochemical cell, and a second electrode contact that is electrically coupled to the second electrochemical cell,
   wherein one of the first and second substrates comprises a cutout area extending therethrough such that one of the first and second electrode contacts is exposed through the cutout area.

23. The battery of claim 1, wherein the frame comprises an exterior geometry that substantially corresponds to an overall geometry of the battery, and an interior area that provides the first and second inner spaces, respectively, of the first and second electrochemical cells.

24. The battery of claim 1, further comprising a pair of frames that are each separately provided over one of the first and second electrochemical cells.

25. The battery of claim 9, wherein the frame comprises an approximately figure-8 geometry with a rectangular extension that extends along the bridge portion of the first substrate layer.

26. The battery of claim 9, wherein a portion of the frame is removed about the bridge portion to form the open gap.

27. The battery of claim 1, wherein the first and second cathodes are connected by a first electrical bridge, and the first and second anodes are connected by a separate second electrical bridge to thereby provide the flexible battery in a parallel cell arrangement, and wherein both of the first and second electrical bridges are flexible and extend across the bridge portion of the first substrate layer.

28. The battery of claim 27, wherein the first electrical bridge comprises a cathode current collector, and the second electrical bridge comprises an anode current collector.

29. The battery of claim 11, wherein the current collector layer is flexible and extends across the bridge portion of the first substrate layer.

30. The battery of claim 11, wherein the first and second cathodes are provided on the current collector layer, and the first and second anodes are provided on a separate anode current collector to thereby provide the flexible battery in a parallel cell arrangement.

31. The battery of claim 16, wherein a portion of the frame is removed about the bridge portion to form the open gap.

32. The battery of claim 17, wherein the first electrochemical comprises a first anode and a first cathode, and the second electrochemical cell comprises a second anode and a second cathode, and wherein the electrical bridge electrically couples one of the first cathode and first anode of the first electrochemical cell to one of the second cathode and second anode of the second electrochemical cell.

33. The battery of claim 32, wherein the electrical bridge comprises a current collector provided on said first substrate and underneath both of said one of the first cathode and first anode of the first electrochemical cell and said one of the second cathode and second anode of the second electrochemical cell.

34. The battery of claim 33, wherein all of said current collector, first and second cathodes, and first and second anodes are comprised of cured or dried inks.

35. The battery of claim 32, wherein the first and second cathodes are connected by a first electrical bridge, and the first and second anodes are connected by a separate second electrical bridge to thereby provide the flexible battery in a parallel cell arrangement.

36. The battery of claim 17, further comprising a flexible conductive layer provided on top of said electrical bridge to thereby mechanically and/or electrically strengthen the electrical bridge.

37. The battery of claim 17, further comprising a first electrode contact that is electrically coupled to the first electrochemical cell, and a second electrode contact that is electrically coupled to the second electrochemical cell.

38. The battery of claim 18, wherein a portion of the frame is removed about the bridge portion to form the open gap.

39. The battery of claim 37, wherein at least one of the first and second electrode contacts extends a distance outwards and is configured to be folded over one of the first and second substrates.

40. The battery of claim 37, wherein one of the first and second substrates comprises a cutout area extending therethrough such that one of the first and second electrode contacts is exposed through the cutout area.

* * * * *